United States Patent
Park et al.

(10) Patent No.: US 11,792,709 B2
(45) Date of Patent: Oct. 17, 2023

(54) ELECTRONIC DEVICE FOR PERFORMING BEAM CHANGE IN WIRELESS COMMUNICATION SYSTEM AND METHOD THEREOF

(71) Applicant: SAMSUNG ELECTRONICS CO., LTD., Suwon-si (KR)

(72) Inventors: Sungchul Park, Suwon-si (KR); Suyoung Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 195 days.

(21) Appl. No.: 17/435,560

(22) PCT Filed: Apr. 8, 2020

(86) PCT No.: PCT/KR2020/004766
§ 371 (c)(1),
(2) Date: Sep. 1, 2021

(87) PCT Pub. No.: WO2020/218759
PCT Pub. Date: Oct. 29, 2020

(65) Prior Publication Data
US 2022/0159540 A1    May 19, 2022

(30) Foreign Application Priority Data
Apr. 22, 2019   (KR) .................. 10-2019-0046658

(51) Int. Cl.
*H04W 36/00* (2009.01)
*H04W 36/30* (2009.01)
(Continued)

(52) U.S. Cl.
CPC ........ *H04W 36/30* (2013.01); *H01Q 21/0025* (2013.01); *H04W 36/0058* (2018.08); *H04W 76/19* (2018.02)

(58) Field of Classification Search
None
See application file for complete search history.

(56) References Cited

U.S. PATENT DOCUMENTS

| 2002/0093453 A1 | 7/2002 | Vail et al. |
| 2013/0332720 A1 | 12/2013 | Gupta et al. |

(Continued)

FOREIGN PATENT DOCUMENTS

| CN | 108684217 | 10/2018 |
| KR | 10-2014-0034509 | 3/2014 |

(Continued)

OTHER PUBLICATIONS

International Search Report for PCT/KR2020/004766 dated Jul. 9, 2020, 5 pages.

(Continued)

*Primary Examiner* — Suhail Khan
(74) *Attorney, Agent, or Firm* — Nixon & Vanderhye, P.C.

(57) ABSTRACT

An electronic device according to various embodiments comprises: a first antenna module configured to receive a serving beam from a first base station by forming a first beam; a second antenna module configured to measure an intensity of a signal of a neighbor beam received from a second base station by forming a second beam; a first temperature sensor configured to measure a temperature corresponding to the first antenna module; a second temperature sensor configured to measure a temperature corresponding to the second antenna module; at least one processor operatively connected to the first antenna module and/or the second antenna module; and a memory operatively connected to the at least one processor, wherein the memory can store instructions which, when executed, cause the least one processor to: determine whether the first antenna module is in an overheated state based on a tem- (Continued)

perature of the first antenna module acquired from the first temperature sensor while performing communication with the first base station through the first antenna module and, based on determining that the first antenna module is in the overheated state, perform handover to the second base station based on channel measurement information regarding the second base station.

14 Claims, 23 Drawing Sheets

(51) Int. Cl.
  *H04W 76/19* (2018.01)
  *H01Q 21/00* (2006.01)

(56) References Cited

U.S. PATENT DOCUMENTS

| | | |
|---|---|---|
| 2014/0073329 A1 | 3/2014 | Kang et al. |
| 2014/0199952 A1 | 7/2014 | Sandhu et al. |
| 2015/0349836 A1 | 12/2015 | Ponukumati et al. |
| 2016/0057660 A1 | 2/2016 | Hong et al. |
| 2017/0295508 A1 | 10/2017 | Stirling-Gallacher et al. |
| 2018/0278309 A1 | 9/2018 | Raghaven et al. |
| 2020/0260350 A1 | 8/2020 | Hong |
| 2022/0029697 A1* | 1/2022 | Bakr .................... H04B 7/0695 |

FOREIGN PATENT DOCUMENTS

| | | |
|---|---|---|
| KR | 10-2014-0118681 | 10/2014 |
| KR | 10-2015-0016997 | 2/2015 |
| KR | 10-2015-0106911 | 9/2015 |

OTHER PUBLICATIONS

Written Opinion of the ISA for PCT/KR2020/004766 dated Jul. 9, 2020, 5 pages.
Indian Office Action dated Jun. 12, 2023 in corresponding Indian Patent Application No. 202117047317.

* cited by examiner

ELECTRONIC DEVICE FOR PERFORMING BEAM CHANGE IN WIRELESS COMMUNICATION SYSTEM AND METHOD THEREOF

CROSS-REFERENCE TO RELATED APPLICATIONS

This application is a national stage of International Application No. PCT/KR2020/004766 designating the United States, filed on Apr. 8, 2020, in the Korean Intellectual Property Receiving Office and claiming priority to Korean Patent Application No. 10-2019-0046658, filed on Apr. 22, 2019, in the Korean Intellectual Property Office, the disclosures of which are incorporated by reference herein in their entireties.

BACKGROUND

Field

The disclosure relates to an electronic device and method for determining whether to change a beam and performing beam change in a wireless communication system.

Description of Related Art

As mobile communication technology evolves, multifunctional portable terminals are commonplace and, to meet increasing demand for radio traffic, vigorous efforts are underway to develop 5G communication systems. To achieve a high data rate, the 5G communication system considers implementation in an ultra-high frequency band that may provide a faster data rate in addition to the high frequency bands adopted by 3G and 4G.

A 5G UE supporting mmWave, which is an ultra-high frequency band, packs a plurality of antenna modules. mmWave radio channels get through high straightness and large path loss due to their nature of high frequency and, to make up for these issues, highly directional beamforming is essential and, to that end, a plurality of antenna modules are needed. For example, a 5G UE may be equipped with a plurality of antenna modules that radiate signals in different directions, and among the plurality of antenna modules, an antenna module capable of forming a beam in the same direction as the beam of the base station (e.g., gNB) may be selected and used for communication.

An mmWave antenna module consumes more power due to an increase in data throughput and use of a high frequency band, ending up causing more heat and hence overheating the antenna module in use or the surroundings of the antenna module. The overheating antenna module or surroundings may cause the user of the portable terminal to feel uncomfortable and even a low-temperature burn. Furthermore, the components (e.g., battery) around the overheating antenna module may be damaged, and the overall performance of the portable terminal may be deteriorated.

SUMMARY

Embodiments of the disclosure may change a candidate beam into a serving beam using a handover or measurement reporting procedure according to the 5G communication standard to perform communication using another antenna module of the portable terminal when the antenna module in use is overheated, thereby reducing heat generation in the 5G UE.

According to various example embodiments of the disclosure, an electronic device comprises: a first antenna module including at least one antenna configured to form a first beam and to receive a serving beam from a first base station, a second antenna module comprising at least one antenna configured to form a second beam and to measure a signal strength of a signal of a neighbor beam received from a second base station, a first temperature sensor configured to measure a temperature of the first antenna module, a second temperature sensor configured to measure a temperature of the second antenna module, at least one processor operatively connected with the first antenna module or the second antenna module, and a memory operatively connected with the at least one processor, wherein the memory may store instructions that, when executed, cause the at least one processor to be configured to: determine whether the first antenna module is in an overheated state based on the temperature of the first antenna module obtained from the first temperature sensor while performing communication with the first base station through the first antenna module and, based on the first antenna module being determined to be in the overheated state, control the electronic device to perform a handover to the second base station based on channel measurement information for the second base station.

According to various example embodiments of the disclosure, an electronic device comprises: a first antenna module comprising at least one antenna configured to form a first beam and to receive a serving beam from a base station, a second antenna module comprising at least one antenna configured to form a second beam and to receive a candidate beam from the base station, a first temperature sensor configured to measure a temperature of the first antenna module, a second temperature sensor configured to measure a temperature of the second antenna module, at least one processor operatively connected with the first antenna module or the second antenna module, and a memory operatively connected with the at least one processor, wherein the memory may store instructions that, when executed, cause the at least one processor to be configured to: determine whether the first antenna module is in an overheated state based on the temperature of the first antenna module obtained from the first temperature sensor while performing communication with the base station using the first beam through the first antenna module and measuring a signal strength of the candidate beam using the second beam in the second antenna module, based on the first antenna module being determined to be in the overheated state, controlling the electronic device to transmit, to the base station, a message including information indicating that a signal strength of the candidate beam measured from the second antenna module is greater than a signal strength of the serving beam measured from the first antenna module by a threshold signal strength or more, and to control the electronic device to receive a serving beam changed from the candidate beam using the second beam in response to reception of a beam change command from the base station based on the transmitted message.

According to various example embodiments of the disclosure, a method for performing a beam change by an electronic device including a plurality of antenna modules and a plurality of temperature sensors configured to measure a temperature of each of the plurality of antenna modules may comprise: determining whether a first antenna module is in an overheated state based on a temperature of the first antenna module obtained from a first temperature sensor while receiving a serving beam using a first beam formed by the first antenna module to perform communication with a first base station and measuring a signal strength of a neighbor beam using a second beam formed by a second antenna module and, based on the first antenna module being determined to be in the overheated state, performing a handover to a second base station, based on channel measurement information for the second base station.

According to various example embodiments, an electronic device and method may stop or reduce the operation of the antenna module in use for a predetermined time upon detecting overheat in the antenna module and perform communication with the base station via another antenna module, thereby preventing and/or reducing damage to components around the antenna module and overall performance degradation of the portable terminal.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
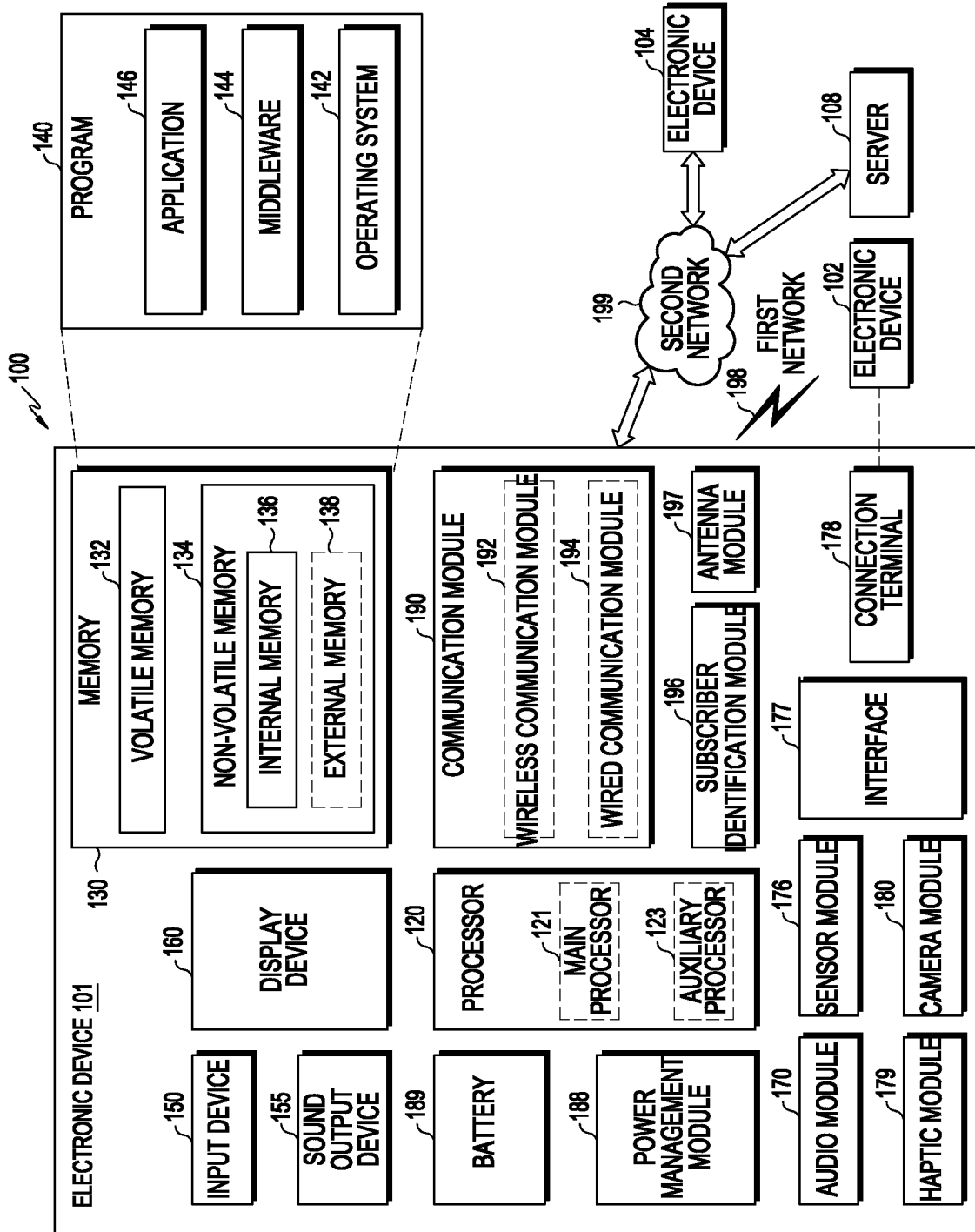
FIG. 1 is a block diagram illustrating an example electronic device in a network environment according to various embodiments.

Hereinafter, various example embodiments of the disclosure are described with reference to the accompanying drawings. However, it should be appreciated that the disclosure is not limited to the embodiments, and all changes and/or equivalents or replacements thereto also belong to the scope of the disclosure. The same or similar reference numbers may be used to refer to the same or similar elements throughout the disclosure and the drawings.

As used herein, the terms "have," "may have," "include," or "may include" a feature (e.g., a number, function, operation, or a component such as a part) indicate the existence of the feature and do not exclude the existence of other features.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially refer to "specifically designed in hardware to." Rather, the term "configured to" may refer to a device that can perform an operation together with another device or parts. For example, the term "processor configured (or set) to perform A, B, and C" may refer to a generic-purpose processor (e.g., a CPU or application processor) that may perform the operations by executing one or more software programs stored in a memory device or a dedicated processor (e.g., an embedded processor) for performing the operations.

Each of the aforementioned components of the electronic device may include one or more parts, and a name of the part may vary with a type of the electronic device. The electronic device in accordance with various embodiments may include at least one of the aforementioned components, omit some of them, or include other additional component(s). Some of the components may be combined into an entity, but the entity may perform the same functions as the components may do.

The terms as used herein are provided merely to describe some embodiments thereof, but not to limit the scope of other embodiments. It is to be understood that the singular forms "a," "an," and "the" include plural references unless the context clearly dictates otherwise. All terms including technical and scientific terms used herein have the same meaning as commonly understood by one of ordinary skill in the art to which the embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

For example, examples of the electronic device according to embodiments may include at least one of a smartphone, a tablet PC, a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, a wearable device (e.g., smart glasses, a head-packaged device (HMD), electronic clothes, an electronic bracelet, an electronic necklace, an electronic appcessory, an electronic tattoo, a smart mirror, a smart watch), etc.

According to various embodiments, the electronic device may be a smart home appliance. Examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™ PlayStation™), an electronic dictionary, an electronic key, a camcorder, an electronic picture frame, etc.

According to an embodiment, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, Internet of Things devices (e.g., a bulb, various sensors, an electric or gas meter, a sprinkler, a fire alarm, a thermostat, a street light, a toaster, fitness equipment, a hot water tank, a heater, or a boiler), etc.

According to various embodiments of the disclosure, examples of the electronic device may at least one of part of furniture or building/structure, an electronic board, an electronic signature receiving device, a projector, various measurement devices (e.g., devices for measuring water, electricity, gas, or electromagnetic waves), etc. According to an embodiment, the electronic device may be one or a combination of the above-listed devices. According to various embodiments, the electronic device may be a flexible electronic device. The electronic device disclosed herein is not limited to the above-listed devices, and may include new electronic devices depending on the development of technology.

FIG. 1 is a block diagram illustrating an example electronic device 101 in a network environment 100 according to various embodiments. Referring to FIG. 1A, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
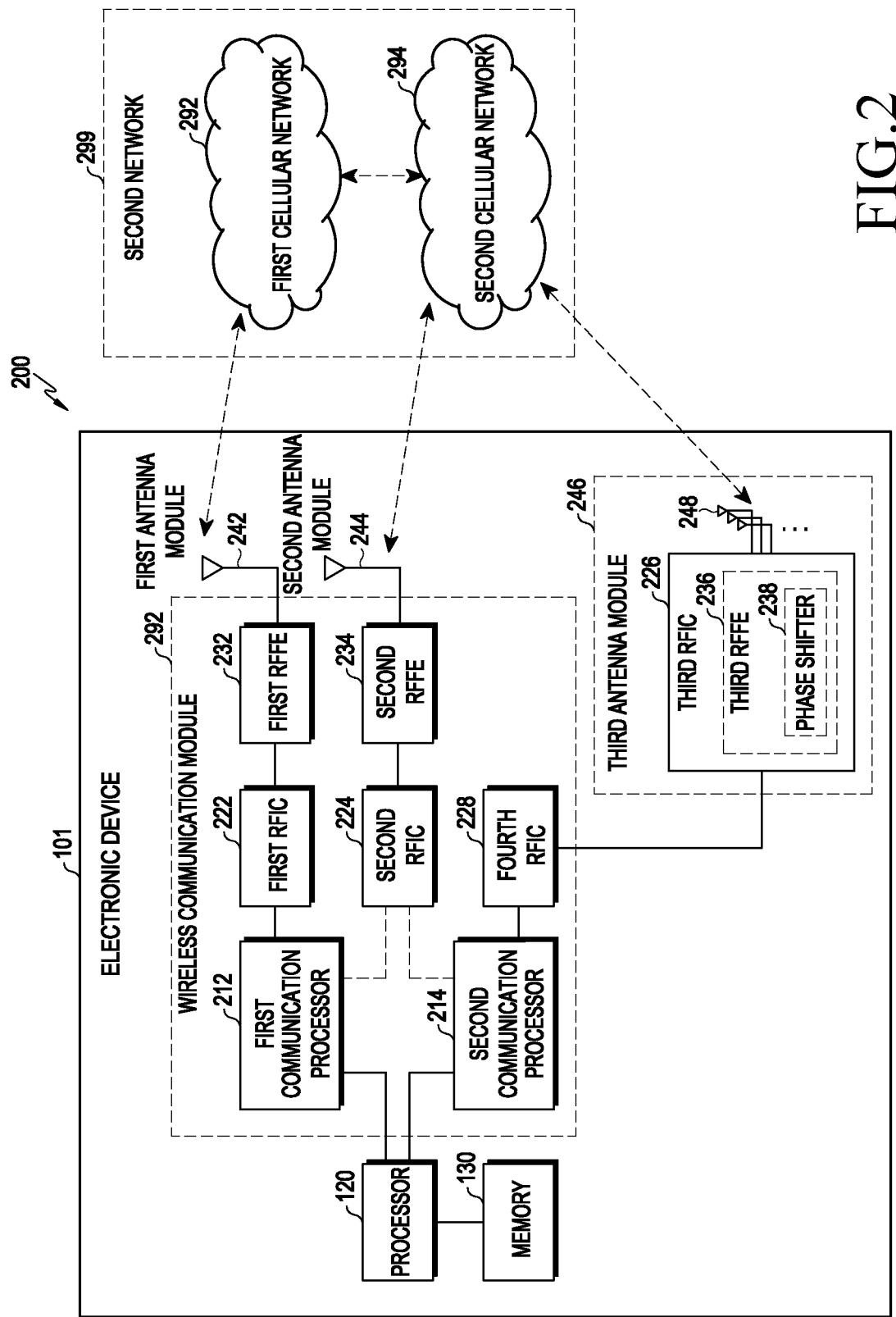
FIG. 2 is a block diagram illustrating an electronic device in a network environment including a plurality of cellular networks according to various embodiments.

FIG. 2 is a block diagram 200 of an electronic device 100 in a network environment including a plurality of cellular networks according to various embodiments. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. The second network 199 may include a first cellular network 292 and a second cellular network 294. According to an embodiment, the electronic device 101 may further include at least one component among the components of FIG. 1, and the second network 199 may further include at least one other network. According to an embodiment, the first communication processor (CP) 212, the second CP 214, the first RFIC 222, the second RFIC 224, the fourth RFIC 228, the first RFFE 232, and the second RFFE 234 may form at least part of the wireless communication module 192. According to an embodiment, the fourth RFIC 228 may be omitted or be included as part of the third RFIC 226.

The first CP 212 may establish a communication channel of a band that is to be used for wireless communication with the first cellular network 292 or may support legacy network communication via the established communication channel. According to an embodiment, the first cellular network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel. According to an embodiment, the first CP 212 and the second CP 214 may be implemented in a single chip or a single package. According to an embodiment, the first CP 212 or the second CP 214, along with the processor 120, an assistance processor 123, or communication module 190, may be formed in a single chip or single package.

Upon transmission, the first RFIC 222 may convert a baseband signal generated by the first CP 212 into a radio frequency (RF) signal with a frequency ranging from about 700 MHz to about 3 GHz which is used by the first cellular network 292 (e.g., a legacy network). Upon receipt, the RF signal may be obtained from the first cellular network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first CP 212.

Upon transmission, the second RFIC 224 may convert the baseband signal generated by the first CP 212 or the second CP 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first CP 212 and the second CP 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second CP 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second CP 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second CP 214.

According to an embodiment, the first RFIC 222 and the second RFIC 224 may be implemented as at least part of a single chip or single package. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second cellular network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 130 and be accessed by other components (e.g., the processor 120, the first CP 212, or the second CP 214).

Figure 3A:
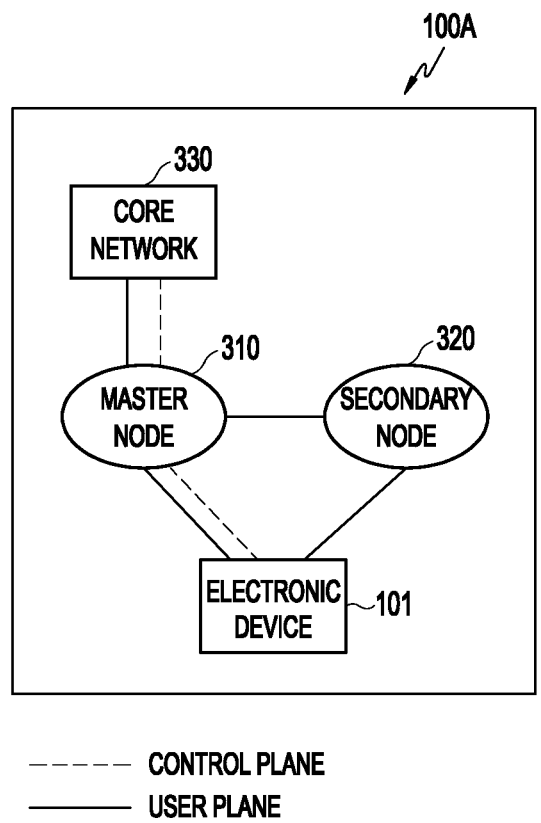
FIGS. 3A, 3B and 3C are diagrams illustrating wireless communication systems providing a legacy communication network and/or a 5G communication network according to various embodiments.
Figure 3B:
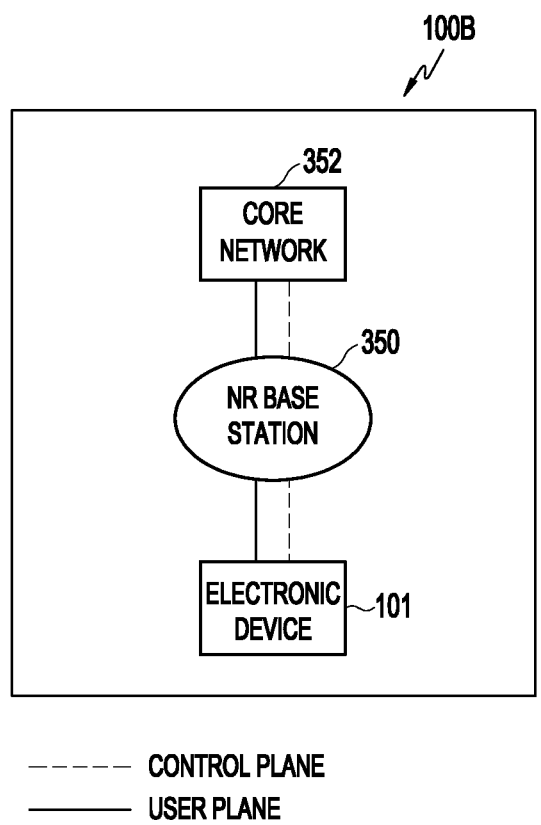
Figure 3C:
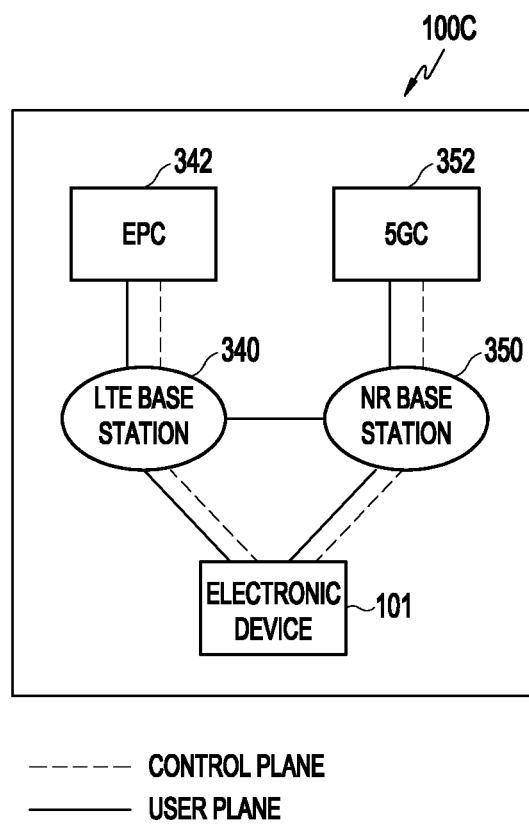

FIGS. 3A, 3B and 3C are diagrams illustrating wireless communication systems providing a legacy communication network and/or a 5G communication network according to various embodiments. Referring to FIGS. 3A, 3B and 3C, the network environments 100A, 100B and 100C may include at least one of a legacy network and a 5G network. The legacy network may include, e.g., a 3GPP-standard 4G or LTE base station 340 (e.g., an eNodeB (eNB)) that supports radio access with the electronic device 101 and an evolved packet core (EPC) 342 that manages 4G communication. The 5G network may include, e.g., a new radio (NR) base station 350 (e.g., a gNodeB (gNB)) that supports radio access with the electronic device 101 and a 5th generation core (5GC) 352 that manages 5G communication for the electronic device 101.

According to an embodiment, the electronic device 101 may transmit or receive control messages and user data via legacy communication and/or 5G communication. The control messages may include, e.g., messages related to at least one of security control, bearer setup, authentication, registration, or mobility management for the electronic device 101. The user data may refer to, e.g., user data except for control messages transmitted or received between the electronic device 101 and the core network 330 (e.g., the EPC 342).

Referring to FIG. 3A, according to an embodiment, the electronic device 101 may transmit or receive at least one of a control message or user data to/from at least part (e.g., the NR base station 350 or 5GC 352) of the 5G network via at least part (e.g., the LTE base station 340 or EPC 342) of the legacy network.

According to an embodiment, the network environment 100A may include a network environment that provides wireless communication dual connectivity (DC) to the LTE base station 340 and the NR base station 350 and transmits or receives control messages to/from the electronic device 101 via one core network 330 of the EPC 342 or the 5GC 352.

According to an embodiment, in the DC environment, one of the LTE base station 340 or the NR base station 350 may operate as a master node (MN) 310, and the other as a secondary node (SN) 320. The MN 310 may be connected with the core network 330 to transmit or receive control messages. The MN 310 and the SN 320 may be connected with each other via a network interface to transmit or receive messages related to radio resource (e.g., communication channel) management therebetween.

According to an embodiment, the MN 310 may include the LTE base station 340, the SN 320 may include the NR base station 350, and the core network 330 may include the EPC 342. For example, control messages may be transmitted/received via the LTE base station 340 and the EPC 342, and user data may be transmitted/received via the LTE base station 340 and the NR base station 350.

According to an embodiment, the MN 310 may include the NR base station 350, and the SN 320 may include the LTE base station 340, and the core network 330 may include the 5GC 352. For example, control messages may be transmitted/received via the NR base station 350 and the 5GC 352, and user data may be transmitted/received via the LTE base station 340 and the NR base station 350.

According to an embodiment, the MN 310 may include the NR base station 350, and the SN 320 may include the NR base station 350, and the core network 330 may include the 5GC 352. For example, control messages may be transmitted/received via the NR base station 350 and the 5GC 352, and user data may be transmitted/received via a first NR base station (e.g., the NR base station 350) and a second NR base station (e.g., the NR base station 350).

Referring to FIG. 3B, according to various embodiments, the 5G network may include the NR base station 350 and the 5GC 352 and transmit or receive control messages and user data independently from the electronic device 101.

Referring to FIG. 3C, according to an embodiment, the legacy network and the 5G network each may provide data transmission/reception independently. For example, the electronic device 101 and the EPC 342 may transmit or receive control messages and user data via the LTE base station 340. As another example, the electronic device 101 and the 5GC 352 may transmit or receive control messages and user data via the NR base station 350.

According to an embodiment, the electronic device 101 may be registered in at least one of the EPC 342 or the 5GC 352 to transmit or receive control messages.

According to an embodiment, the EPC 342 or the 5GC 352 may interwork with each other to manage communication for the electronic device 101. For example, mobility information for the electronic device 101 may be transmitted or received via the interface between the EPC 342 and the 5GC 352.

Figure 4:
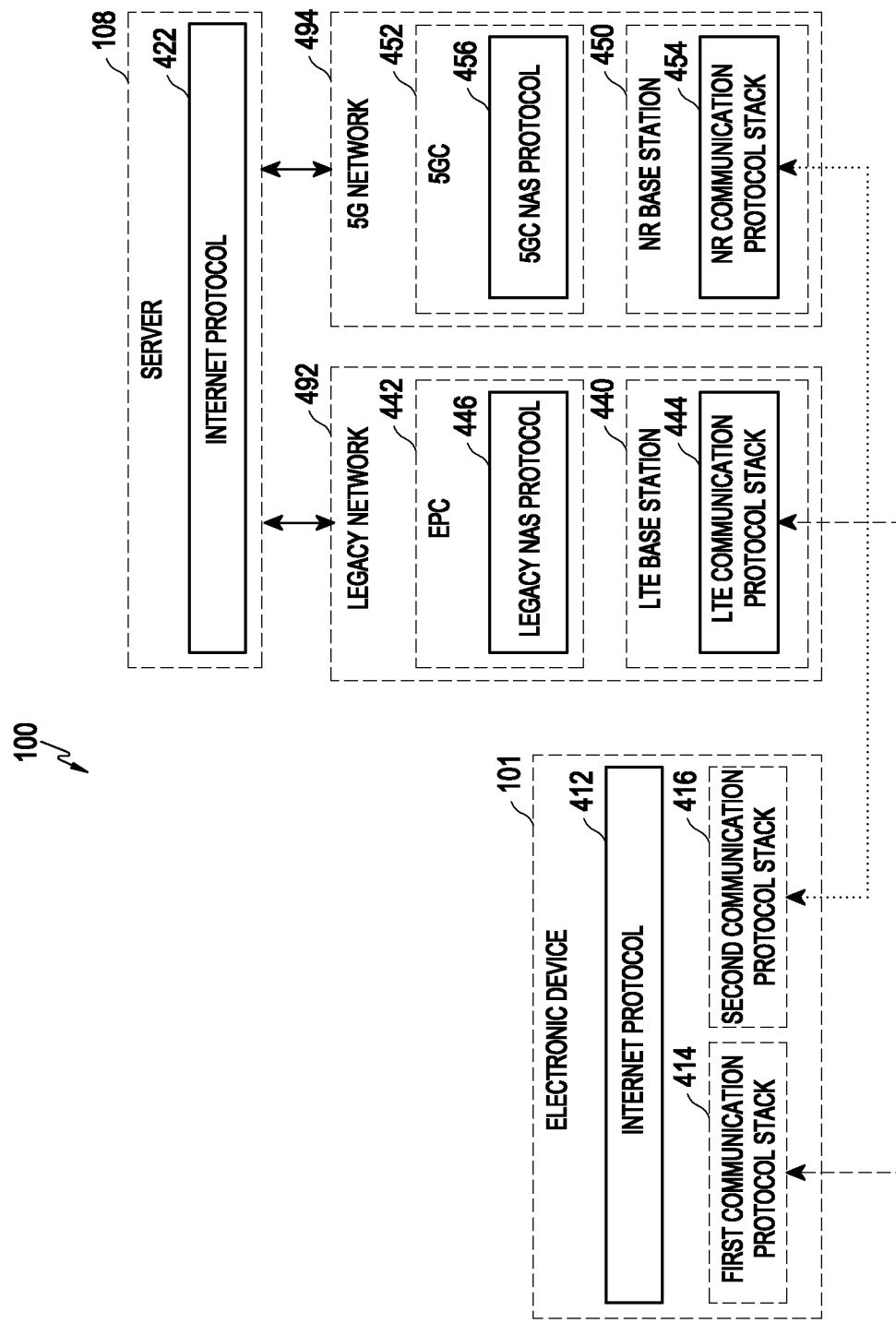
FIG. 4 is a diagram illustrating a protocol stack structure of a network for legacy communication and/or 5G communication according to various embodiments.

FIG. 4 is a diagram illustrating a protocol stack structure of a network 100 for legacy communication and/or 5G communication according to various embodiments. According to the illustrated embodiment, the network 100 may include an electronic device 101, a server 108, a legacy network 492, and a 5G network 494.

The electronic device 101 may include an Internet protocol 412, a first communication protocol stack 414, and a second communication protocol stack 416. The electronic device 101 may communicate with a server 108 through a legacy network 492 and/or a 5G network 494.

According to an embodiment, the electronic device 101 may perform Internet communication associated with the server 108 using the Internet protocol 412 (e.g., TCP, UDP, and/or IP). The Internet protocol 312 may be executed by, e.g., a main processor (e.g., the main processor 121 of FIG. 1) included in the electronic device 101.

According to an embodiment, the electronic device 101 may wirelessly communicate with the legacy network 492 using the first communication protocol stack 414. According to an embodiment, the electronic device 101 may wirelessly communicate with the 5G network 494 using the second communication protocol stack 416. The first communication protocol stack 414 and the second communication protocol stack 416 may be executed by, e.g., one or more communication processors (e.g., the wireless communication module 192 of FIG. 1) included in the electronic device 101.

The server 108 may include an Internet protocol 422. The server 108 may transmit/receive data related to the Internet protocol 422 to/from the electronic device 101 through the legacy network 492 and/or the 5G network 494. According to an embodiment, the server 108 may include a cloud computing server that exists outside the legacy network 492 or 5G network 494. In an embodiment, the server 108 may include an edge computing server (or a mobile edge computing (MEC) server) located inside at least one of the legacy network 492 or the 5G network 494.

The legacy network 492 may include an LTE base station 440 and an EPC 442. The LTE base station 440 may include an LTE communication protocol stack 444. The EPC 442 may include a legacy non-access stratum (NAS) protocol 446. The legacy network 492 may perform LTE wireless communication with the electronic device 101 using the LTE communication protocol stack 444 and the legacy NAS protocol 446.

The 5G network 494 may include an NR base station 450 and a 5GC 452. The NR base station 450 may include an NR communication protocol stack 454. The 5GC 452 may include a 5G NAS protocol 456. The 5G network 494 may perform NR wireless communication with the electronic device 101 using the NR communication protocol stack 454 and the 5G NAS protocol 456.

According to an embodiment, the first communication protocol stack 414, the second communication protocol stack 416, the LTE communication protocol stack 444, and the NR communication protocol stack 454 may include a control plane protocol for transmitting and receiving control messages and a user plane protocol for transmitting and receiving user data. The control messages may include, e.g., messages related to at least one of security control, bearer setup, authentication, registration, or mobility management. The user data may include data other than control messages, for example.

According to an embodiment, the control plane protocol and the user plane protocol may include physical (PHY), medium access control (MAC), radio link control (RLC), or packet data convergence protocol (PDCP) layers. The PHY layer may, e.g., channel-code and modulate the data received from a higher layer (e.g., the MAC layer) and transmit it via a radio channel and may demodulate and decode the data received via a radio channel and deliver it to the higher layer. The PHY layer included in the second communication protocol stack 416 and the NR communication protocol stack 454 may further perform an operation related to beamforming The MAC layer may logically/physically map to a radio channel to transmit/receive data and perform a hybrid automatic repeat request (HARD) for error correction. The RLC layer may perform concatenation, segmentation, or reassembly of data, and may identify the order of data, rearrange data, or redundancy-check data, for example. The PDCP layer may perform operations related to, e.g., ciphering and data integrity of control data and user data. The second communication protocol stack 416 and the NR communication protocol stack 454 may further include a service data adaptation protocol (SDAP). The SDAP may manage the allocation of radio bearers based on the quality-of-service (QoS) of user data.

According to various embodiments, the control plane protocol may include a radio resource control (RRC) layer and a non-access stratum (NAS) layer. The RRC layer may process control data related to radio bearer setup, paging, or mobility management, for example. The NAS may handle control messages related to, e.g., authentication, registration, and mobility management.

Figure 5A:
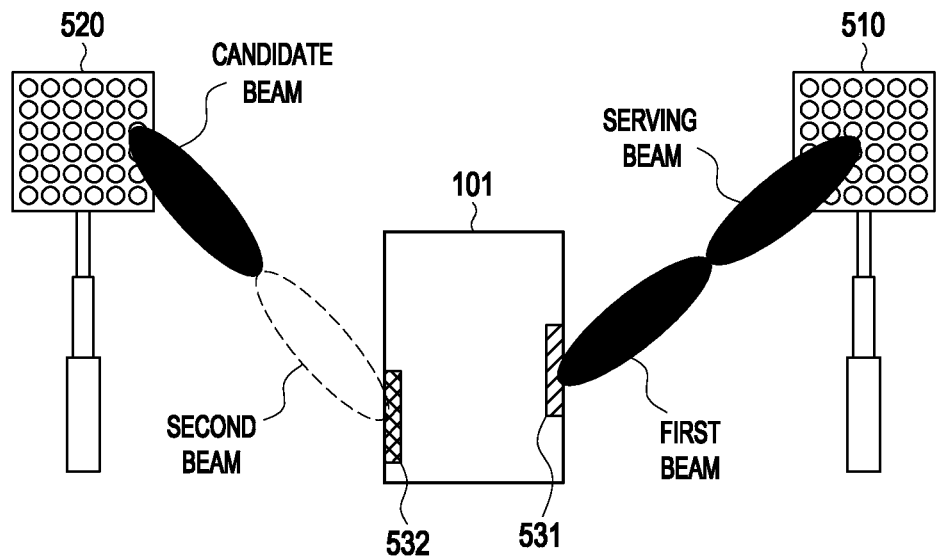
FIGS. 5A and 5B are diagrams illustrating a beam changing operation according to various embodiments.
Figure 5B:
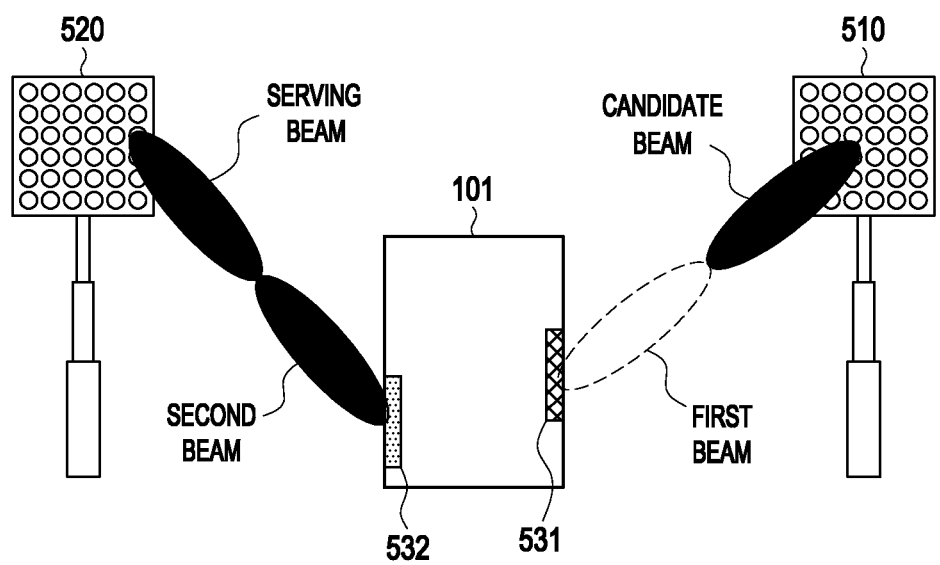

FIGS. 5A and 5B are diagrams illustrating a beam changing operation according to various embodiments.

In FIG. 5A, the electronic device 101 according to various embodiments may be configured to form a first beam in a first direction towards a first transmission reception point (TRP) 510 using a first antenna module 531 among a plurality of antenna modules and receive a serving beam using the first beam. The first antenna module 531 may receive the serving beam using the first beam formed in the first direction to thereby communicate with the first TRP 510. The electronic device 101 may be configured to form a second beam in a second direction towards a first transmission reception point (TRP) 520 using a second antenna module 532 among the plurality of antenna modules and receive a neighbor beam or a candidate beam using the second beam. When the electronic device 101 performs communication with the first TRP 510 using the first beam, the second beam is not used for communication, and may be formed when measuring the signal strength for the neighbor beam or the candidate beam received from the second TRP. For example, the second antenna module 532 may not perform data transmission/reception, and is enabled when measuring the channel state of the electronic device 101 to report a result of measurement of a synchronization signal block (SSB) or a channel state information-reference signal (CSI-RS) to the base station (gNB).

According to various embodiments, the first antenna module 531 and the second antenna module 532 may include microwave antenna modules capable of transmitting signals to the outside or receiving signals from the outside in a 5G communication environment and may correspond to at least one of the first antenna module 242, the second antenna module 244, or the third antenna module 246 of FIG. 2.

According to various embodiments, the first TRP 510 and the second TRP 520 may include external access devices that form a beam with the antenna module of the electronic device 101 to thereby perform communication. For example, the first TRP 510 and the second TRP 520 may be included in the same base station (gNB). In this case, the electronic device 101 may select a serving beam based on channel states for beams operated by the base station during communication with the base station and use it for communication. As another example, the first TRP 510 and the second TRP 520 may be included in different base stations (gNBs). In this case, the second TRP 520 may be included in the base station of a neighbor cell adjacent to the cell to which the base station including the first TRP 510 belongs. The electronic device 101 may select a base station capable of providing the best channel performance in the current location as a serving base station and may perform communication using a beam formed towards the serving base station as the serving beam.

According to various embodiments, the electronic device 101 may change the serving beam via beam switching in response to an occurrence of a designated situation while communicating with the first TRP 510 through the serving beam using the first antenna module 531. The designated situation may include at least one of movement of the user, generation of a traffic load, or performance degradation of the antenna module being used. According to various embodiments, when the electronic device 101 detects that the first antenna module 531 operating for communication generates heat over a designated level, the electronic device 101 may stop the operation of the first antenna module 531 and change the serving beam as illustrated in FIG. 5B.

According to various embodiments, the electronic device 101 may periodically or continuously check the temperature of the first antenna module 531 while performing communication with the first TRP 510 via the first antenna module 531 and, if the temperature of the first antenna module 531 exceeds a threshold temperature set as an overheat reference temperature, determine that it has been overheated. Upon identifying that the first antenna module 531 has been overheated, the electronic device 101 may perform communication using the second antenna module 532 instead of the first antenna module 531. The second antenna module 532 may be one that forms a beam with the highest channel performance among a plurality of candidate beams (or a plurality of neighbor beams) that the electronic device 101, along with the base station, may form using the plurality of antenna modules. To perform communication using the second antenna module 532, the electronic device 101 may change the existing candidate beam (or neighbor beam) received with the second beam into the serving beam. While the existing candidate beam (or neighbor beam) is changed to the serving beam, the first antenna module 531 may stop the operation for communication, and during the time, the heat of the first antenna module 531 may be reduced. While the first antenna module 531 in an overheated state reduces heat, the first antenna module 531 may perform an operation for measuring the channel state of the candidate beam or the neighbor beam. According to various embodiments, if it is identified that the temperature of the first antenna module 531 exceeds a designated level and is overheated, the first antenna module 531 may be excluded from a candidate beam list or neighbor beam list during a predetermined time not to be measured for its channel state and, if the heat of the first antenna module 531 reduces to a reference temperature or less after the predetermined time elapses, the first antenna module 531 may be added back to the candidate beam list or neighbor beam list to be measured for its channel state.

Figure 6:
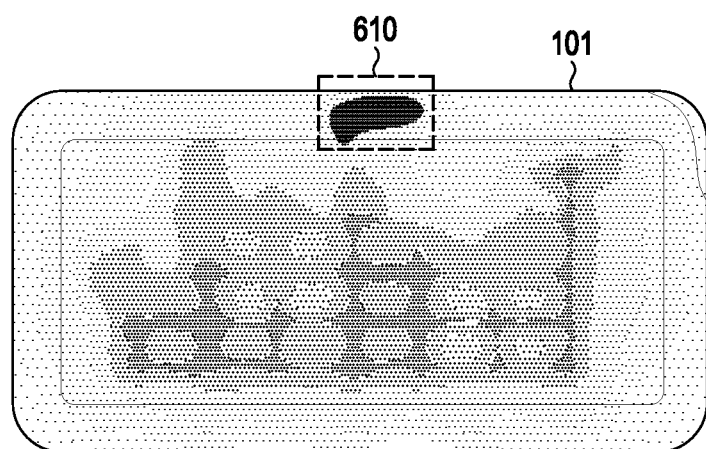
FIG. 6 is a diagram illustrating a temperature distribution of an electronic device when overheating of an antenna module occurs, according to various embodiments.

FIG. 6 is a diagram illustrating a temperature distribution of an electronic device 101 when overheating of an antenna module occurs, according to various embodiments.

Since a microwave antenna module is required to process more data using a high frequency band, it consumes lots of power and generates more heat. If the antenna module which is being operated for communication with the base station heats up, an overheat area 610 may be formed with respect to the position of the antenna module in the electronic device 101 as shown in FIG. 6. If the overheat area 610 is formed in the electronic device 101, the user of the electronic device 101 may feel uncomfortable, and the overheat area 610 and its surrounding components (e.g., battery) may be damaged. As a result, the overall performance of the electronic device 101 may be affected.

Figure 7:
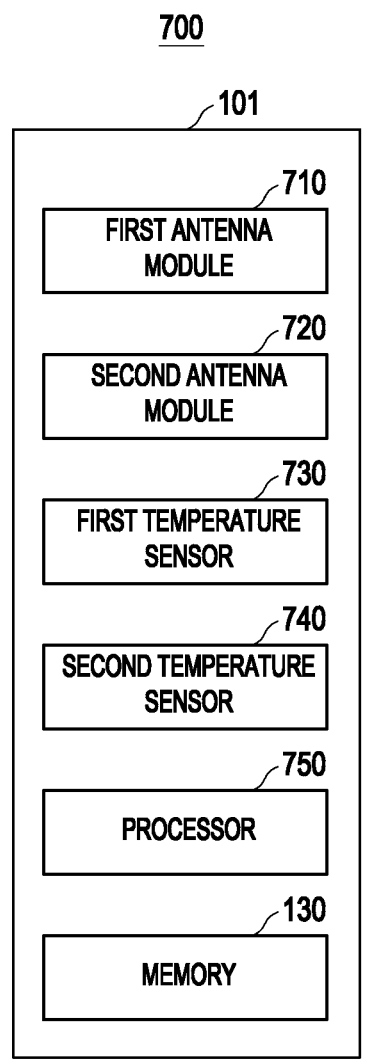
FIG. 7 is a block diagram illustrating an electronic device according to various embodiments.

FIG. 7 is a block diagram 700 illustrating an electronic device 101 according to various embodiments. The electronic device 101 may be a device (e.g., a smartphone or tablet computer) that changes an antenna being operated for data transmission/reception through beam switching in response to detection of an overheated state of the operating antenna module and may include a first antenna module (e.g., including at least one antenna) 710, a second antenna module (e.g., including at least one antenna) 720, a first temperature sensor 730, a second temperature sensor 740, at least one processor (e.g., including processing circuitry) 750, and/or a memory 130.

According to various embodiments, the first antenna module 710 may form a first beam towards a first transmission reception point (TRP) to receive a serving beam from the first TRP, and the second antenna module 720 may form a second beam towards a second TRP to receive a neighbor beam or a candidate beam from the second TRP. According to an embodiment, the first TRP may be a TRP included in a first base station. The second TRP may be a TRP included in the first base station or a second base station different from the first base station. The first base station may be a serving base station (e.g., a gNB or the NR base station 450 of FIG. 4) that transmits/receives data through a wireless connection between the electronic device 101 and a 5G network. The second base station may be a base station (e.g., a gNB or the NR base station 450 of FIG. 4) that belongs to a neighbor cell adjacent to the cell where the first base station belongs. When the electronic device 101 performs communication with the first TRP using the first antenna module 710, the second antenna module 720 may not perform operations for data transmission/reception but may perform operations for signal strength measurement upon measuring the channel state of the neighbor beam or candidate beam.

According to various embodiments, the first temperature sensor 730 may measure a temperature corresponding to the first antenna module 710, and the second temperature sensor 740 may measure a temperature corresponding to the second antenna module 720. The first temperature sensor 730 may be included in the first antenna module 710 or disposed around the first antenna module 710 and may periodically or continuously measure temperature while the first antenna module 710 may receive the serving beam from the first TRP and performs communication with the first base station. The second temperature sensor 740 may be included in the second antenna module 720 or disposed around the second antenna module 720 and may periodically or continuously measure temperature while the second antenna module performs communication with the second TRP.

According to various embodiments, the at least one processor 750 may include various processing circuitry, including, an application processor (e.g., the processor 120 of FIG. 2) or at least one communication processor (e.g., the first communication processor 212 or the second communication processor 214 of FIG. 2). For example, at least one communication processor 214 included in the at least one processor 750 may be operatively connected with the first antenna module 710 and the second antenna module 720. As another example, the application processor 120 included in the at least one processor 750 may be operatively connected with the first temperature sensor 730 or the second temperature sensor 740.

According to various embodiments, the memory 130 may be operatively connected with the at least one processor 750.

According to various embodiments, the memory 130 may store instructions that, when executed, cause the at least one processor 750 to control the electronic device 101 to change the antenna module used for transmission/reception with the base station using a handover procedure upon detecting an overheated state of the first antenna module 710. For example, the at least one processor 750 may determine whether the first antenna module 710 is in an overheated state based on the temperature of the first antenna module 710, obtained from the first temperature sensor 730 while performing communication with the first base station using the first antenna module 710. The at least one processor 750 may determine that the first antenna module 710 is in an overheated state when it is identified that the temperature of the first antenna module 710 is equal to or greater than a first threshold temperature set as an overheat reference. Since the temperature sensors corresponding to the antenna modules are disposed in different positions, a different threshold temperature, as a reference for determining whether the antenna module is in an overheated state, may be set for each antenna module.

According to various embodiments, when it is determined that the first antenna module 710 is in an overheated state, the at least one processor 750 may perform communication using the second antenna module 720. As an example, the second base station may be determined as a handover target base station based on channel measurement information for the second base station determined using the second antenna module 720. According to various embodiments, the at least one processor 750 may receive, from the first base station, an instruction regarding channel state measurement for one or more neighbor beams or candidate beams as a condition for performing a handover and may measure the strength of one or more neighbor beams or candidate beams according to the instruction received from the first base station to thereby determine the channel state of the target cell. For example, the at least one processor 750 may measure the strengths of signals received through the one or more neighbor beams or candidate beams, calculate the average of the measurements indicating signal strengths not less than a reference value received from the first base station, and determine it as the channel measurement state of the cell. As another example, the at least one processor 750 may measure the strength of signals received through the one or more beams and determine that the measurement for the beam showing the best signal strength among them is the channel measurement state of the cell.

According to various embodiments, the at least one processor 750 may determine signal strength measurements for neighbor beams or candidate beams to perform handover. For example, the at least one processor 750 may determine the channel state value, obtained from the first base station or stored in the electronic device 101, as the reference value and select a neighbor beam or candidate beam, which exhibits a signal strength over the reference value, as a target beam. Beam strength measurement for neighbor beams or candidate beams may be determined using at least one of a primary synchronization signal (PSS), secondary synchronization signal (SSS), or demodulation reference signal (DMRS) of physical broadcast channel (PBCH) included in a synchronization signal/physical broadcast channel (SS/PBCH) block. As another example, the at least one processor 750 may determine signal strength measurements for neighbor beams or candidate beams using a channel state information-reference signal (CSI-RS) set by the first base station. The CSI-RS may be one set by the first base station to measure the signal strength of the neighbor beams or candidate beams or one set in the electronic device 101 by the first base station to allow a channel measurement result for each cell to be calculated. As another example, the at least one processor 750 may determine the signal strength of the neighbor beam or the candidate beams using a reference signal (RS) for beam measurement configured in the electronic device 101.

According to various embodiments, the at least one processor 750 may obtain information related to performing handover from the first base station. The handover execution-related information may include a channel state reference value for performing handover, information for determining the channel state of a candidate base station based on the strength of one or more neighbor beams or candidate beams, or information for at least one candidate base station. Using the handover execution-related information obtained from the first base station, the at least one processor 750 may compare the channel state reference value with the signal strength measurements for the neighbor beams and may determine the neighbor beam received via the second beam formed by the second antenna module 720 as a target beam for performing handover, based on the result of comparison. For example, the neighbor beam determined as the target beam may be any one of neighbor beams exceeding the channel state reference value or one for which the best signal strength is measured among neighbor beams exceeding the channel state reference value. According to various embodiments, the handover execution-related information may include handover offset information. In this case, the at least one processor 750 may prevent frequent handover by determining the channel state reference value in a manner to add or subtract the offset information to/from the channel state of the serving beam or serving base station.

The information for the at least one candidate base station regards a list of at least one candidate base station selectable as a target base station based on the channel state information measured for candidate base stations belonging to neighbor base stations while the electronic device 101 performs communication with the first base station and may include at least one of frequency bands or cell IDs of the at least one candidate base station. Upon obtaining the information for the at least one candidate base station from the first base station, the at least one processor 750 may determine that the second base station forming a second beam with the second antenna module 720 is the target base station based on the list of the at least one candidate base station. For example, the second base station may be one exhibiting the best channel state in the list of the at least one candidate base station or one selected from among base stations exceeding the channel state reference value for performing handover.

According to various embodiments, the handover execution-related information received by the electronic device 101 from the first base station may include a timer value indicating a time during which information for the at least one candidate base station is valid. For example, when the timer expires, the handover execution-related information or information for at least one candidate base station, received from the first base station, may not be valid any longer. If the handover execution-related information or information for the at least one candidate base station is not valid any longer, the electronic device 101 may delete the information and obtain updated information from the first base station.

According to various embodiments, the at least one processor 750 may perform handover to the second base station in response to detection of an overheated state of the first antenna module 710. For example, the at least one processor 750 may attempt random access to the second base station among the candidate base stations belonging to neighbor cells and send a request for radio resource control (RRC) connection reestablishment. If RRC connection reestablishment of the second base station is performed according to the request, the at least one processor 750 may receive an RRC connection establishment message from the second base station, change the existing neighbor beam, received by the second beam formed between the second antenna module 720 and the second base station, to a new serving beam, and perform communication with the second base station.

According to various embodiments, the at least one processor 750 may periodically or continuously measure the temperature of the first antenna module 710 using the first temperature sensor 730 while performing communication with the second base station using the second antenna module 720. The at least one processor 750 may identify whether the temperature of the first antenna module 710 is a second threshold temperature or more and determine whether to include the first antenna module 710 or the first beam in the neighbor beam list. The second threshold temperature may be a neighbor beam measurement reference set for the first antenna module. For example, if it is identified that the temperature of the first antenna module 710 is equal to or higher than the second threshold temperature, it is possible to reduce the heat of the first antenna module 710 which is in an overheated state in such a manner as to exclude the first antenna module 710 or the first beam from the neighbor beam list during a designated time not to perform channel state measurement on the first antenna module 710. The at least one processor 750 may add the first antenna module 710 or the first beam back to the neighbor beam list after the designated time elapses. According to various embodiments, upon identifying that the temperature of the first antenna module 710 is less than the second threshold temperature after the designated time, the at least one processor 750 may add the first antenna module 710 or the first beam to the neighbor beam list and perform periodic channel state measurement on the first beam formed by the first antenna module 710. If it is identified that the temperature of the first antenna module 710 is the second threshold temperature or more even after the designated time elapses, the at least one processor 750 may put on hold the adding of the first antenna module 710 or first beam to the neighbor beam list until the temperature of the first antenna module 710 is reduced to less than the second threshold temperature.

According to various embodiments, the memory 130 may store instructions that, when executed, by the at least one processor 750 control the electronic device 101 to change the antenna module used for transmission/reception with the base station using a measurement reporting procedure upon detecting an overheated state of the first antenna module 710. For example, the at least one processor 750 may perform communication with the first base station using the first beam via the first antenna module 710 and may measure the strength of a candidate beam or neighbor beam using the second beam of the second antenna module 720. According to an embodiment, the at least one processor 750 may perform communication with the first base station using the first beam and measure the strength of the serving beam using the second beam of the second antenna module 720. During the above operation, the at least one processor 750 may determine whether the first antenna module 710 is in an overheated state based on the temperature of the first antenna module 710 obtained from the first temperature sensor 730. The at least one processor 750 may determine that the first antenna module 710 is in an overheated state when it is identified that the temperature of the first antenna module 710 is equal to or greater than a first threshold temperature set as an overheat reference.

According to various embodiments, upon determining that the first antenna module 710 is in an overheated state, the at least one processor 750 may transmit, to the base station, a message including measurement report information indicating that the signal strength measured for the second antenna module 720 is larger than the signal strength measured for the first antenna module 710 by a threshold or more. The signal strength may be a reference signal received power (RSRP) or a beam reference signal received power (BRSRP). According to various embodiments, the at least one processor 750 may select a beam adjacent to the first beam (e.g., a beam formed in a direction slightly off the serving beam) from among the plurality of beams formed for the base station, measure the signal strength, determine the measured signal strength as the signal strength of the serving beam received using the first beam via the first antenna module 710, and generate the message. According to various embodiments, the at least one processor 750 may stop the operation of the first antenna module 710 determined to be in the overheated state, measure the signal strength of the first beam and the signal strength of the second beam using the second antenna module 720, and generate the message. According to an embodiment, if it is identified that the signal strength of the second beam measured using the second antenna module 720 is larger, by the threshold or more, than the signal strength of the first beam measured using the second antenna module 720, the at least one processor 750 may transmit measurement information for the first beam and the second beam, along with the message, to the base station. According to various embodiments, if it is identified that the signal strength of the second beam is not larger, by the threshold or more, than the signal strength of the serving beam, the at least one processor 750 may receive the existing serving beam through the second antenna module 720 and continue communication with the base station.

According to various embodiments, the at least one processor 750 may receive, from the base station, a beam change command corresponding to the transmitted message and, in response to the beam change command, configure it to receive the serving beam through the second beam formed by the second antenna module 720 and perform communication with the base station.

According to various embodiments, in response to detection of the overheated state of the first antenna module 710, the at least one processor 750 may transmit, to the base station, a beam change request for changing one of candidate beams capable of data transmission/reception using the second antenna module 720 to the serving beam, instead of the message including the signal strength measurement results of beams. For example, the at least one processor 750 may transmit, to the base station, the beam change request through a separate message or signaling or may request a serving beam change using a random access channel (RACH) signal. Upon receiving a beam change command corresponding to the beam change request from the base station, the at least one processor 750 may change the existing candidate beam received using the second beam via the second antenna module 720 to a new serving beam and continue communication with the base station.

According to various embodiments, the at least one processor 750 may periodically or continuously measure the temperature of the first antenna module 710 using the first temperature sensor 730 while performing communication with the base station using the second antenna module 720. The at least one processor 750 may identify whether the temperature of the first antenna module 710 is not less than a second threshold temperature set as a candidate beam measurement reference for the first antenna module 710, and determine whether to include the first antenna module 710 or the first beam in the candidate beam list. For example, if it is identified that the temperature of the first antenna module 710 is equal to or higher than the second threshold temperature, it is possible to reduce the heat of the first antenna module 710 which is in an overheated state in such a manner as to exclude the first antenna module 710 or the first beam from the candidate beam list during a designated time not to perform channel state measurement on the first antenna module 710. The at least one processor 750 may add the first antenna module 710 or the first beam back to the candidate beam list after the designated time elapses. According to various embodiments, upon identifying that the temperature of the first antenna module 710 is less than the second threshold temperature after the designated time, the at least one processor 750 may add the first antenna module 710 or the first beam to the candidate beam list and perform periodic channel state measurement on the first beam formed by the first antenna module 710. If it is identified that the temperature of the first antenna module 710 is the second threshold temperature or more even after the designated time elapses, the at least one processor 750 may put on hold the adding of the first antenna module 710 or first beam to the candidate beam list until the temperature of the first antenna module 710 is reduced to less than the second threshold temperature.

According to various example embodiments, an electronic device comprises: a first antenna module including at least one antenna configured to form a first beam and receive a serving beam from a first base station, a second antenna module including at least one antenna configured to form a second beam and measure a signal strength of a signal of a neighbor beam received from a second base station, a first temperature sensor configured to measure a temperature corresponding to the first antenna module, a second temperature sensor configured to measure a temperature corresponding to the second antenna module, at least one processor operatively connected with the first antenna module and/or the second antenna module, and a memory operatively connected with the at least one processor. The memory may store instructions which, when executed, cause the at least one processor to: determine whether the first antenna module is in an overheated state based on the temperature of the first antenna module obtained from the first temperature sensor while performing communication with the first base station through the first antenna module and, based on the first antenna module being determined to be in the overheated state, perform a handover to the second base station based on channel measurement information for the second base station.

According to various example embodiments, the instructions, when executed, may cause the at least one processor to determine that the first antenna module is in the overheated state based on the temperature of the first antenna module not being less than a first threshold temperature set as an overheat reference for the first antenna module.

According to various example embodiments, the instructions, when executed, may cause the at least one processor to: obtain, from the first base station, handover execution-related information including a channel state reference value for handover, compare the channel state reference value with a signal strength value measured for the second antenna module, and perform a handover to the second base station based on a result of the comparison.

According to various example embodiments, the instructions, when executed, may cause the at least one processor to: obtain, from the first base station, information for at least one candidate base station and perform a handover to the second base station based on the information for the at least one candidate base station.

According to various example embodiments, the instructions, when executed, may cause the at least one processor to control the electronic device to: send a request for radio resource control (RRC) connection reestablishment to the second base station, receive an RRC connection establishment message corresponding to the request from the second base station, and perform communication with the second base station using the second antenna module.

According to various example embodiments, the instructions, when executed, may cause the at least one processor to: identify whether the temperature of the first antenna module is not less than a second threshold temperature set as a neighbor beam strength measurement reference for the first antenna module, exclude the first beam from a neighbor beam list based on the temperature of the first antenna module not being less than the second threshold temperature, and add the first beam to the neighbor beam list after a designated time elapses.

According to various example embodiments, the instructions, when executed, may cause the at least one processor to: measure the temperature of the first antenna module according to a designated period using the first temperature sensor and add the first beam to the neighbor beam list based on the measured temperature of the first antenna module being identified as less than the second threshold temperature.

According to various example embodiments, an electronic device comprises: a first antenna module including at least one antenna configured to form a first beam and receive a serving beam from a base station, a second antenna module including at least one antenna configured to form a second beam and receive a candidate beam from the base station, a first temperature sensor configured to measure a temperature corresponding to the first antenna module, a second temperature sensor configured to measure a temperature corresponding to the second antenna module, at least one processor operatively connected with the first antenna module and/or the second antenna module, and a memory operatively connected with the at least one processor. The memory may store instructions which, when executed, cause the at least one processor to: determine whether the first antenna module is in an overheated state based on the temperature of the first antenna module obtained from the first temperature sensor while performing communication with the base station using the first beam through the first antenna module and measuring a signal strength of the candidate beam using the second beam in the second antenna module, based on the first antenna module being determined to be in the overheated state, control the electronic device to: transmit, to the base station, a message including information indicating that a signal strength of the candidate beam measured from the second antenna module is larger than a signal strength of the serving beam measured from the first antenna module by a threshold or more, and receive a serving beam changed from the candidate beam using the second beam in response to receiving a beam change command from the base station based on the transmitted message.

According to various example embodiments, the instructions, when executed, may cause the at least one processor to: select a beam adjacent to the first beam from among a plurality of beams formed for the base station, measure the signal strength received via the selected adjacent beam, determine the measured signal strength of the adjacent beam as a signal strength of the serving beam measured from the first antenna module, and generate the message.

According to various example embodiments, the instructions, when executed, may cause the at least one processor to: stop the operation of the first antenna module, which is determined to be in the overheated state, measure at least one of the signal strength for the first beam or the signal strength for the second beam using the second antenna module, and generate the message based on a result of the measurement.

According to various example embodiments, the instructions, when executed, may enable the at least one processor to control the electronic device to: transmit, to the base station, the message including information regarding the signal strength for the second beam based on the signal strength measurement for the second beam being identified as larger than the signal strength measurement for the first beam by a threshold or more.

According to various example embodiments, the instructions, when executed, may cause the at least one processor to control the electronic device to: perform communication with the base station via the first beam using the second antenna module based on a difference between the signal strength for the second beam and the signal strength for the first beam measured using the second antenna module being identified as less than a threshold.

According to various example embodiments, the instructions, when executed, may cause the at least one processor to: identify whether the temperature of the first antenna module is not less than a second threshold temperature set as a candidate beam strength measurement reference for the first antenna module, exclude the first beam from a candidate beam list based on the temperature of the first antenna module not being less than the second threshold temperature, and add the first beam to the candidate beam list after a designated time elapses.

FIGS. 8A, 8B, 8C and 8D are perspective views illustrating a configuration of internal modules packaged in an electronic device 101 according to various embodiments.

Figure 8A:
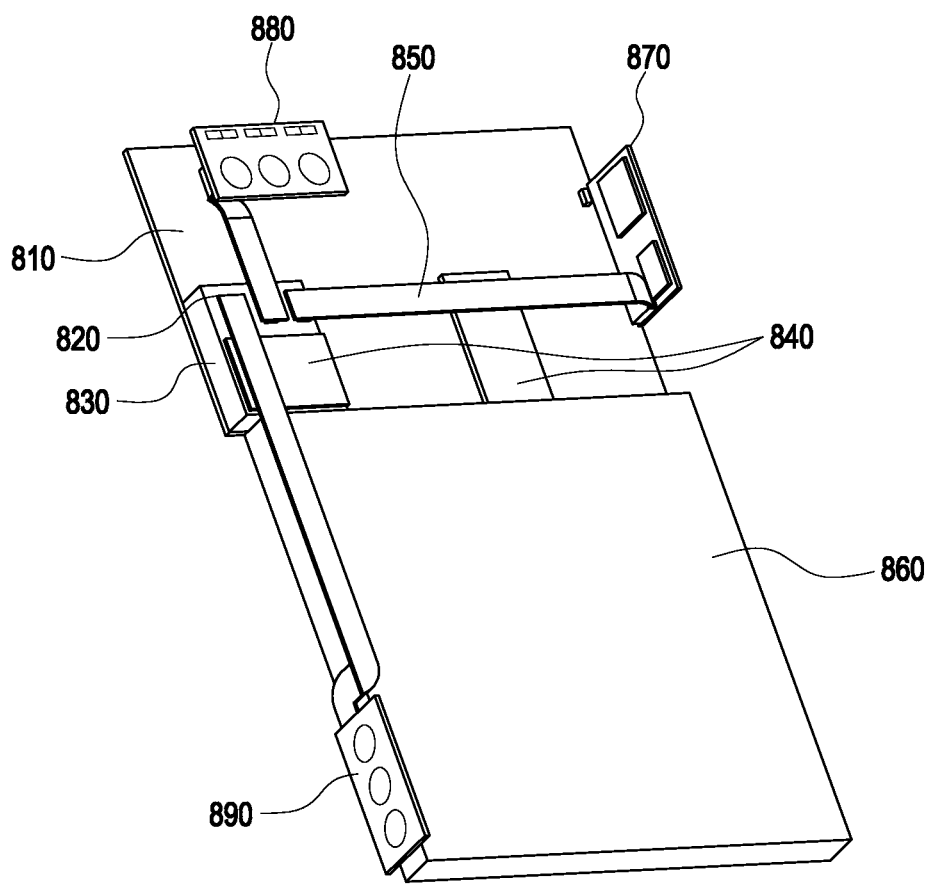
FIGS. 8A, 8B, 8C and 8D are perspective views illustrating an example configuration of internal modules packaged in an electronic device according to various embodiments.
Figure 8B:
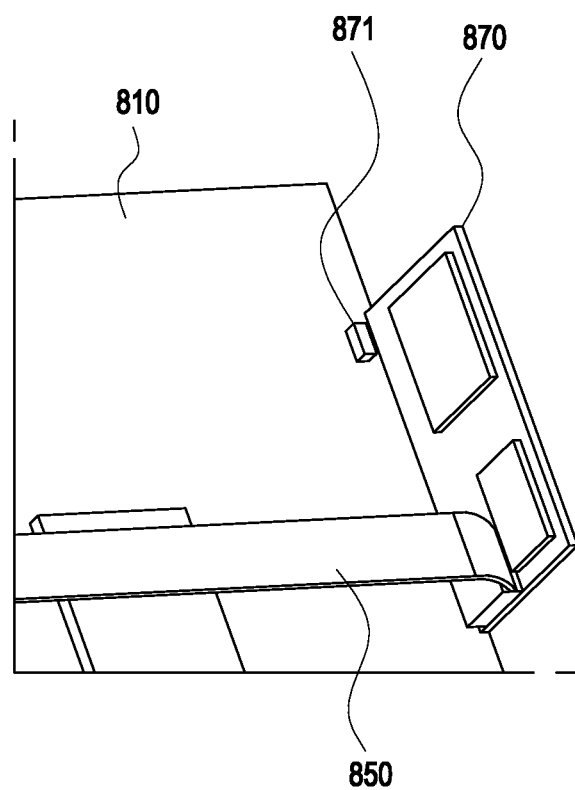
Figure 8C:
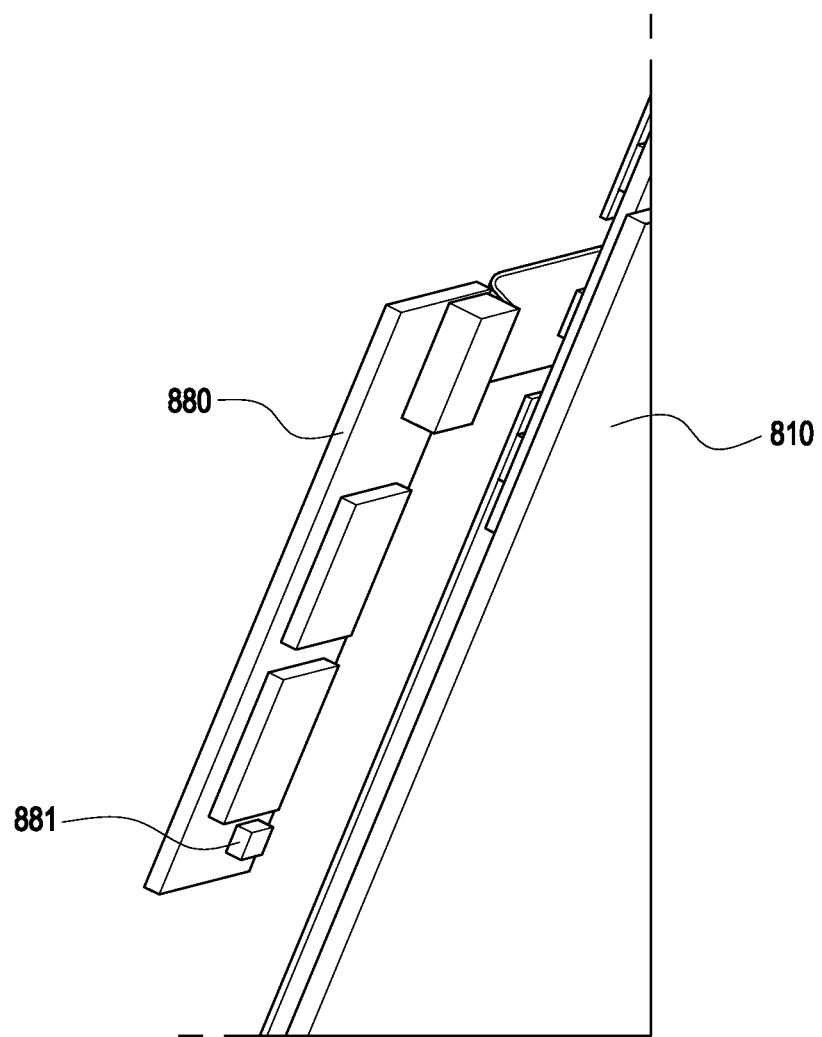
Figure 8D:
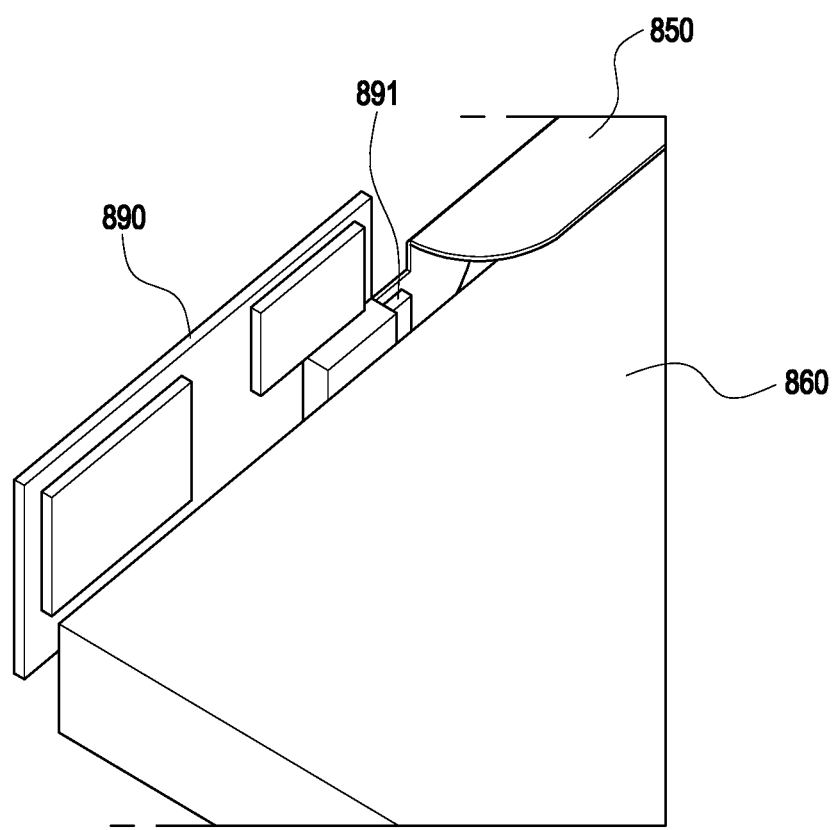

FIG. 8A is a perspective view of a configuration of modules packaged in a housing of the electronic device 101, as viewed from one side, and FIG. 8B illustrates a configuration of a first antenna module 870 included in the electronic device 101. FIG. 8C illustrates a configuration of a second antenna module 880 included in the electronic device 101, and FIG. 8D illustrates a configuration of a third antenna module 890 included in the electronic device 101.

Referring to FIG. 8A, the electronic device 101 may include, in the housing, a main printed circuit board (PCB) 810, a sub PCB 820, a battery 860, a first antenna module 870, a second antenna module 880, and/or a third antenna module 890.

The main PCB 810 may include a plurality of conductive layers and a plurality of non-conductive layers alternately stacked with the conductive layers. The main PCB 810 may provide electrical connections between electronic components arranged on, or outside of, the main PCB 810, using wires and conductive vias formed on or through the conductive layers.

According to various embodiments, the main PCB 810 may be electrically connected with other modules via a plurality of connectors or an interposer 830 or flexible printed circuit board (FPCB) 850. For example, the main PCB 810 may be electrically connected with the sub PCB 820 via the interposer 830, and the sub PCB 820 may be electrically connected with the first antenna module 870, the second antenna module 880, and the third antenna module 890 via the FPCB 850.

According to various embodiments, the sub PCB 820 may include a CP and an intermediate frequency integrated circuit (IFIC), and these components may be packaged inside a shield can 840 in FIG. 8A. The CP may include a communication processor (e.g., the wireless communication module 192 of FIG. 1, or the first communication processor 212 or the second communication processor 214 of FIG. 2) in charge of communication functions, such as data transmission/reception, and may support LTE communication and/or 5G communication of the electronic device 101. According to various embodiments, the CP may include a first CP (e.g., the first communication processor 212 of FIG. 2) supporting legacy network communication and a second CP (e.g., the second communication processor 214 of FIG. 2) supporting 5G network communication. An AP may be mounted on a PCB under the sub PCB 820. The AP may include a processor (e.g., the processor 120 of FIG. 1 or the processor 120 of FIG. 2) in charge of controlling the electronic device 101 and may control at least one other component (e.g., a hardware or software component) of the electronic device 101 and perform various data processing or computation. According to various embodiments, a temperature sensor may be added around the CP or AP to identify whether the CP or AP is overheated.

The FPCB 850 may include an mmWave transceiver control signal line, a PMIC control signal line, a PMIC power supply line, or a signal line for the IFIC.

According to various embodiments, the first antenna module 870 (e.g., the third antenna module 246 of FIG. 2) may include a module PCB, a microwave transceiver, a PMIC, or an antenna array. For example, an mmWave transceiver or PMIC may be disposed on a first surface of the module PCB of the first antenna module 870, and the antenna array may be disposed on a second surface which is different from the first surface. The antenna array may include a patch antenna array and emit signals in a first side direction (e.g., a right side direction of the electronic device 100) of the electronic device 101. To identify whether the first antenna module 870 is overheated, a first temperature sensor 871 may be additionally disposed as illustrated in FIG. 8B. The first temperature sensor 871 may be disposed on the main PCB 810 adjacent to the first antenna module 870 and may measure the temperature of the first antenna module 870 according to a designated period or continuously to identify the degree of heat generation. The first temperature sensor 871 may be connected to the CP or the AP, and the temperature information for the first antenna module 870 measured by the first temperature sensor 871 may be transmitted to the CP or the AP to determine whether it is overheated.

According to various embodiments, the second antenna module 880 (e.g., the first antenna module 242 or second antenna module 244 of FIG. 2) may include a module PCB, a microwave transceiver, a PMIC, or an antenna array. For example, an mmWave transceiver or PMIC may be disposed on a first surface of the module PCB of the second antenna module 880, and the antenna array may be disposed on a second surface which is different from the first surface. According to various embodiments, the antenna array may include both a dipole antenna array and a patch antenna array. The dipole antenna array may radiate signals in a second side direction (e.g., the top direction of the electronic device 101) of the electronic device 101, and the patch antenna array may radiate signals in a third side direction (e.g., a rear direction perpendicular to the patch) of the electronic device 101. To identify whether the second antenna module 880 is overheated, a second temperature sensor 881 may be additionally disposed as illustrated in FIG. 8C. The second antenna module 880 may be disposed to be spaced apart from the main PCB 810 by a predetermined distance, and when the second temperature sensor 881 is disposed on the main PCB 810, the accuracy of heat generation measurement for the second antenna module 880 may be reduced. For this reason, the second temperature sensor 881 may be disposed on the module PCB to the second antenna module 880 and may measure the temperature of the second antenna module 880 according to a designated period or continuously to identify the degree of heat generation. The second antenna module 880 including both the dipole antenna array and the patch antenna array may include the module PCB which is relatively large in area as compared with the other antenna modules. Thus, the module PCB of the second antenna module 880 may have a space for packing the second temperature sensor 881. The temperature information for the second antenna module 880 measured by the second temperature sensor 881 may be transferred to the CP or AP, and the CP or AP may determine whether the second antenna module 880 is overheated based on the temperature information for the second antenna module 880 obtained from the second temperature sensor 881.

According to various embodiments, the third antenna module 890 (e.g., the first antenna module 242 or second antenna module 244 of FIG. 3) may include a module PCB, a microwave transceiver, a PMIC, or an antenna array. For example, an mmWave transceiver or PMIC may be disposed on a first surface of the module PCB of the third antenna module 890, and the antenna array may be disposed on a second surface which is different from the first surface. The antenna array may include a patch antenna array and emit signals in a fourth side direction (e.g., a left side direction of the electronic device 101) of the electronic device 101. To identify whether the third antenna module 890 is overheated, a third temperature sensor 891 may be additionally disposed as illustrated in FIG. 8D. Since the third antenna module 890 is disposed adjacent to the battery 860 placed on the bottom of the main PCB 810, the third antenna module 890 may be spaced apart from the main PCB 810 at a significant distance. Unlike the second antenna module 880, the third antenna module 890 may include the patch antenna array alone and the module PCB may not be large in size. Given the limited modular PCB area of the third antenna module 890 and measurement accuracy of the third temperature sensor 891, the third temperature sensor 891 may be disposed on the FPCB 850 in a position adjacent to the third antenna module 890 and may measure the temperature of the third antenna module 890 according to a designated period or continuously, thereby identifying the degree of heat generation. The third temperature sensor 891 may be connected with the CP or AP to transfer the temperature information measured for the third antenna module 890 to the CP or AP.

According to various embodiments, a reference for determining the degree of heating for the antenna modules may be set to differ per antenna module. Although the temperature information measured by the temperature sensor disposed corresponding to each antenna module inside the electronic device 101 may be proportional to the surface heating state of each antenna module, a different reference for determining heating information may be set per module as shown in Table 1 because the amount of heat transferred to the outside of the antenna module may be varied depending on the packing structure or heat-radiating structure of each antenna module.

TABLE 1

|  | first antenna module 870 | second antenna module 880 | third antenna module 890 |
| --- | --- | --- | --- |
| overheat reference temperature | 70° C. | 75° C. | 65° C. |
| candidate beam measurement reference temperature | 60° C. | 60° C. | 55° C. |

For example, if the overheat temperature of the first antenna module 870 measured by the first temperature sensor 871 is not less than 70 degrees Celsius which is set as the overheat reference temperature for the first antenna module, the first antenna module 870 may be determined to be in the overheated state. When the first antenna module 870 is identified to be overheated, the electronic device 101 may perform communication using the second antenna module 880 or the third antenna module 890 instead of the first antenna module 870. While communication is performed using the second antenna module 880 or the third antenna module 890, the communication operation of the first antenna module 870 may be stopped to reduce heat in the first antenna module 870. While the first antenna module 871 in an overheated state reduces heat, it may be determined based on 60 degrees, set as the candidate beam measurement reference temperature for the first antenna module 870, whether to include it in the candidate beam list or neighbor beam list. For example, if the temperature of the first antenna module 870 is 60 degrees or higher, the first antenna module 870 may be excluded from the candidate beam list or the neighbor beam list for a designated time and, if the temperature of the first antenna module 870 is reduced below 60 degrees after the designated time elapses, the first antenna module 870 may be included back in the candidate beam list or the neighbor beam list. Referring to Table 1, the overheat reference temperature and candidate beam measurement reference temperature for the second antenna module 880 or the third antenna module 890 may be set to differ from those of the first antenna module 870 and may be used as heating state determination references when the second antenna module 880 or the third antenna module 890 operates. The overheat reference temperature and candidate beam measurement reference temperature for each antenna module may be set as a hysteresis condition for each antenna module, preventing a state variation in determination of heating. The per-module heating information determination references shown in Table 1 are provided merely as an example and are not limited by any embodiment but may rather be set to various values considering the placement of the temperature sensor corresponding to each antenna module.

Figure 9:
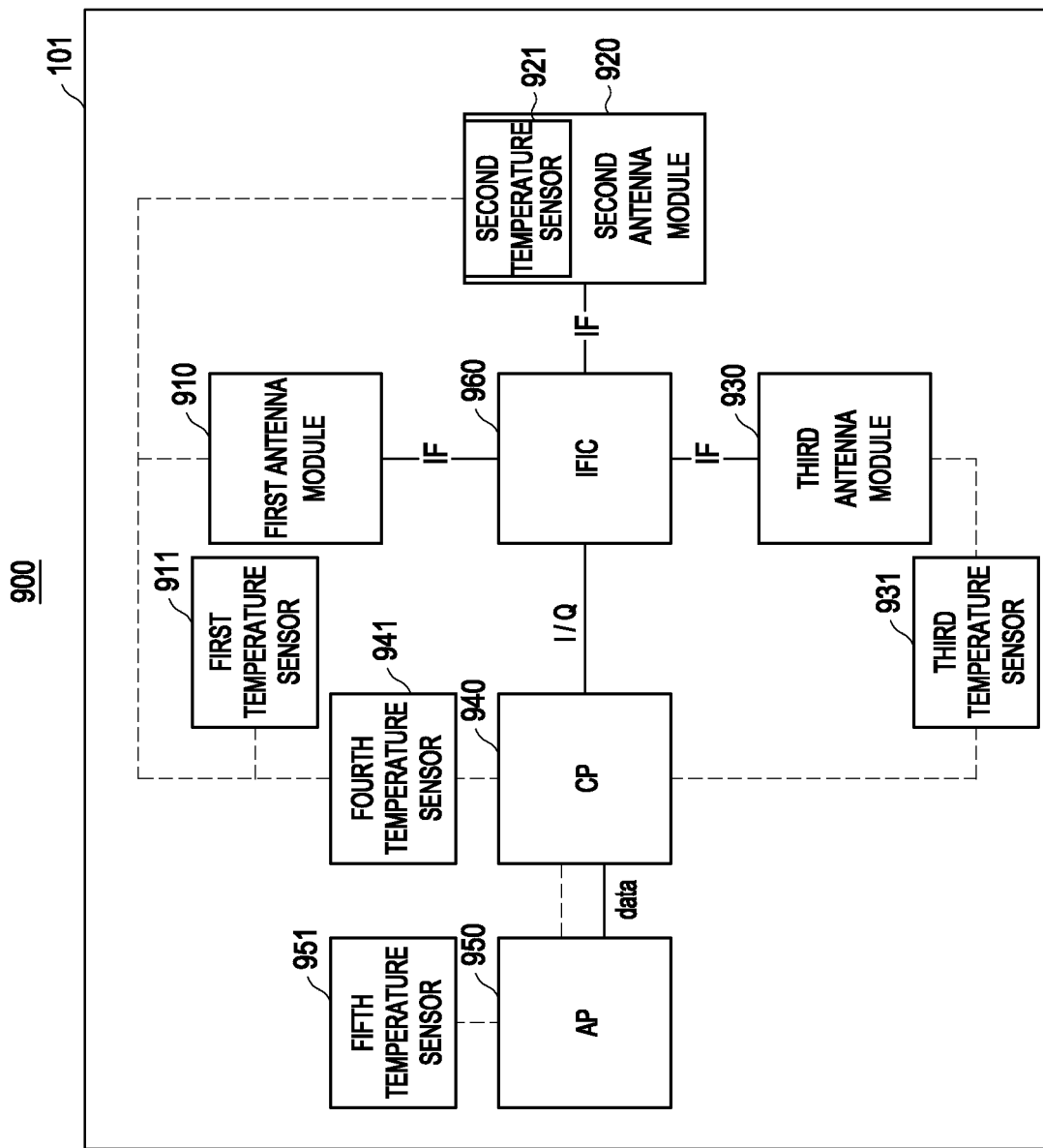
FIG. 9 is a block diagram illustrating an example configuration of main modules packaged in an electronic device according to various embodiments.

FIG. 9 is a block diagram 900 illustrating an example configuration of main modules mounted in an electronic device 101 according to various embodiments. In FIG. 9, connections associated with communication and data signals may be depicted in solid lines, and connections associated with temperature information measured by the temperature sensor may be depicted in dashed lines.

According to various embodiments, an electronic device 101 may include a first antenna module (e.g., including at least one antenna) 910, a first temperature sensor 911, a second antenna module (e.g., including at least one antenna) 920, a second temperature sensor 921, a third antenna module (e.g., including at least one antenna) 930, a third temperature sensor 931, a CP 940, a fourth temperature sensor 941, an AP 950, a fifth temperature sensor 951, and/or an IFIC 960.

Referring to FIG. 9, the first temperature sensor 911 corresponding to the first antenna module 910 (e.g., the third antenna module 246 of FIG. 2) may be mounted on the main PCB 810 adjacent to the first antenna module 910 may be connected, through signal lines included in the main PCB 810, with the CP 940 (e.g., the wireless communication module 192 of FIG. 1, or the first communication processor 212 or the second communication processor 214 of FIG. 2) or the AP 950 (e.g., the processor 120 of FIG. 1 or the processor 120 of FIG. 2). The first antenna module 910 and the first temperature sensor 911 may correspond to the first antenna module 870 and the first temperature sensor 871, respectively, of FIG. 8B.

The second temperature sensor 921 corresponding to the second antenna module 920 (e.g., the first antenna module 242 or the second antenna module 244 of FIG. 2) may be mounted on the module PCB of the second antenna module 920 and may be connected to the CP 940 or the AP 950 through the FPCB 850. The second antenna module 920 and the second temperature sensor 921 may correspond to the second antenna module 880 and the second temperature sensor 881, respectively, of FIG. 8C.

The third temperature sensor 931 corresponding to the third antenna module 930 (e.g., the first antenna module 242 or the second antenna module 244 of FIG. 2) may be mounted on the FPCB 850 adjacent to the third antenna module 930 and may be connected to the CP 940 or the AP 950 through the FPCB 850. The third antenna module 930 and the third temperature sensor 931 may correspond to the third antenna module 890 and the third temperature sensor 891, respectively, of FIG. 8D.

The fourth temperature sensor 941 is a module for measuring temperature information corresponding to the CP 940, and may be mounted on the sub PCB 820 adjacent to the CP 940 and may be connected with the CP 940 or the AP 950 through signal lines included in the sub PCB 820.

The fifth temperature sensor 951 is a module for measuring temperature information corresponding to the AP 950, and may be mounted on the main PCB 810 adjacent to the CP 950 and may be connected with the CP 940 or the AP 950 through signal lines included in the main PCB 810.

The IFIC 960 may exchange intermediate frequency (IF) signals with the first antenna module 910, the second antenna module 920, or the third antenna module 930 and may exchange baseband in-phase/quadrature-phase (I/Q) signals with the CP 940.

According to various embodiments, the first to fifth temperature sensors 911, 921, 931, 941, and 951 may be connected to the CP 940 or the AP 950. For example, temperature information measured by the first to fifth temperature sensors 911, 921, 931, 941, and 951 may be transferred to the AP 950, and the AP 950 may determine the degree of heat generation for each module and transfer the result of determination to the CP 940. As another example, the temperature information measured by the first to fifth temperature sensors 911, 921, 931, 941, and 951 may be transmitted to the CP 940, and the CP 940 may directly determine the degree of heat generation for each module.

Figure 10:
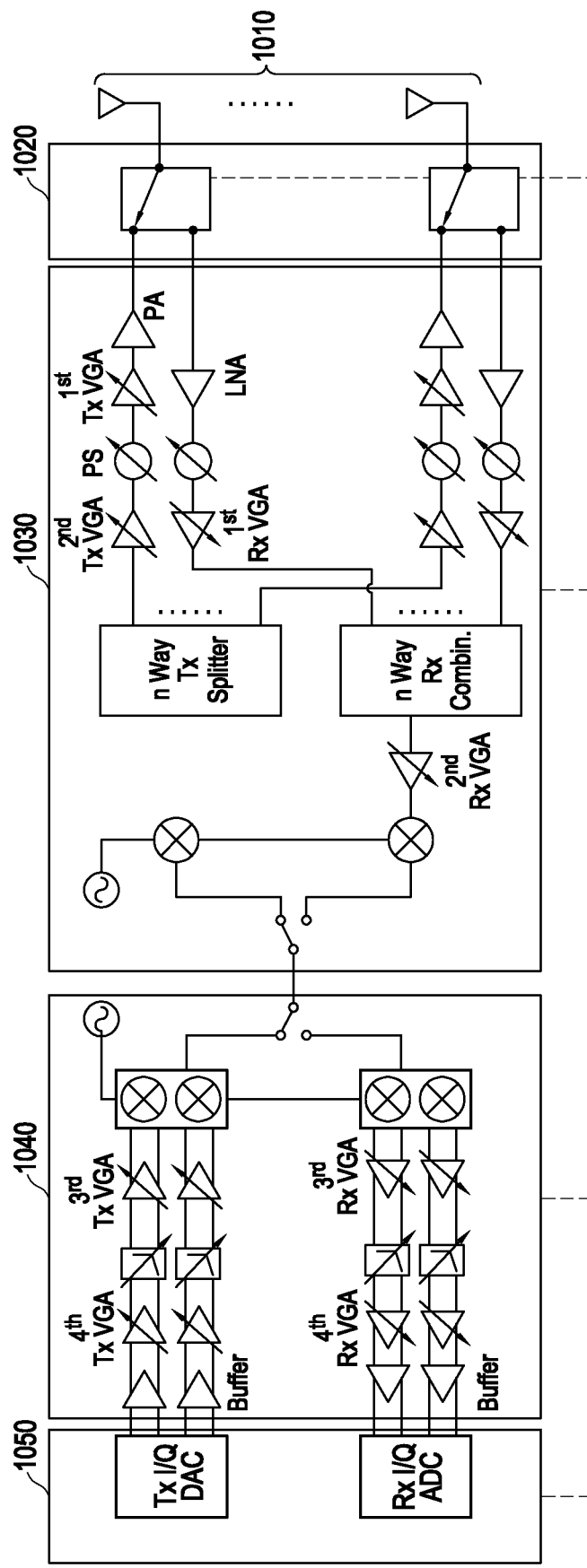
FIG. 10 is a circuit diagram illustrating an example configuration of internal modules in an electronic device according to various embodiments.

FIG. 10 is a circuit diagram illustrating a configuration of internal modules in an electronic device 101 according to various embodiments.

Referring to FIG. 10, an antenna array 1010 may be configured in a form in which n antennas are spaced apart from each other by a predetermined interval. The antenna array 1010 may be connected with a switch module 1020, and may be connected to a transmit (Tx) chain upon transmission during time division duplexing (TDD) communication and may be connected to a receive (Rx) chain upon reception.

The Tx chain inside the RFIC 1030 may include a power amplifier (PA), a 1st variable gain amplifier (VGA), a phase shifter (PS), a 2nd VGA, an n way transmit (Tx) splitter, or a mixer. The PA may be mounted inside or outside the RFIC 1030 to perform high-power amplification on the Tx signal. Each of the VGAs may perform an auto gain control operation on the Tx signal according to the control of the CP 1050, and the number of the VGAs may increase or decrease depending on cases. The PS may shift the phase of the Tx signal according to the beamforming angle according to the control of the CP 1050. The n-way Tx splitter may split the Tx signal received from the mixer it into n signals. The mixer may up-convert the Tx-IF signal received from the IFIC 1040 into an RF-band Tx signal and, during the course, a signal to be mixed may be obtained from an internal or external oscillator.

The Rx chain inside the RFIC 1030 may include a low noise amplifier (LNA), a phase shifter (PS), a 1st VGA, an n way receive (Rx) combiner, a 2nd VGA, or a mixer. The LAN may perform low-noise amplification on the signal received from the antenna array 1010. Each of the VGAs may perform an auto gain control operation on the Rx signal according to the control of the CP 1050, and the number of the VGAs may increase or decrease depending on cases. The PS may shift the phase of the Tx signal according to the beamforming angle according to the control of the CP 1050. The n-way Rx combiner may combine signals which are phased-shifted and aligned in phase, and the combined signals may be transferred through the 2nd VGA to the mixer. The mixer may down-convert the received signal from RF band to IF band, and in this process, a signal to be mixed may be obtained from an internal or external oscillator.

A switch for selectively connecting the Tx/Rx chains may be further included at the rear end of the mixer in the RFIC 1030. When the IF frequency is high, the transmission line connections between the RFIC 1030 and the IFIC 1040 may be complicated. It is possible to reduce the number of transmission lines between the RFIC 1030 and the IFIC 1040 by selectively connecting the Tx chain and the Rx chain upon TDD operation, using the switch. Like the RFIC 1030, the IFIC 1040 may also include a switch for selectively connecting the Tx chain or Rx chain.

The Tx chain inside the IFIC 1040 may include a quadrature mixer, a 3rd VGA, a low pass filter (LPF), a 4th VGA, or a buffer. The buffer plays a role as a buffer upon receiving the balanced Tx I/Q signal from the CP 1050, thereby enabling stable signal processing. The 3rd VGA and the 4th VGA may perform an automatic gain control operation on the Tx signal according to the control of the CP 1050. The LPF may serve as a channel filter to allow the bandwidth of the baseband Tx I/Q signal to operate as a cutoff frequency. The cutoff frequency may vary according to circumstances. The quadrature mixer may up-convert the balanced Tx I/Q signal to a transmit intermediate frequency (Tx-IF) signal.

The Rx chain inside the IFIC 1040 may include a quadrature mixer, a 3rd VGA, an LPF, a 4th VGA, or a buffer. The buffer may serve as a buffer in the process of transferring the balanced Rx I/Q signal, which has gone through the 4th VGA, to the CP 1050, allowing for stable processing of the signal. The 3rd VGA and the 4th VGA may perform an automatic gain control operation on the Rx signal according to the control of the CP 1050. The LPF may serve as a channel filter to allow the bandwidth of the baseband Rx I/Q signal to operate as a cutoff frequency. The cutoff frequency may vary according to circumstances. The quadrature mixer may down-convert the signal into a Rx-IF signal, generating a balanced Rx I/Q signal.

The Tx I/Q digital-to-analog converter (DAC) inside the CP 1050 may convert the digital signal modulated by the modem into a balanced Tx I/Q signal and transmit it to the IFIC 1040. The Rx I/Q analog-to-digital converter (ADC) inside the CP 1050 may convert the balanced Rx I/Q signal down-converted by the IFIC 1040 into a digital signal and transmit it to the modem.

Figure 11:
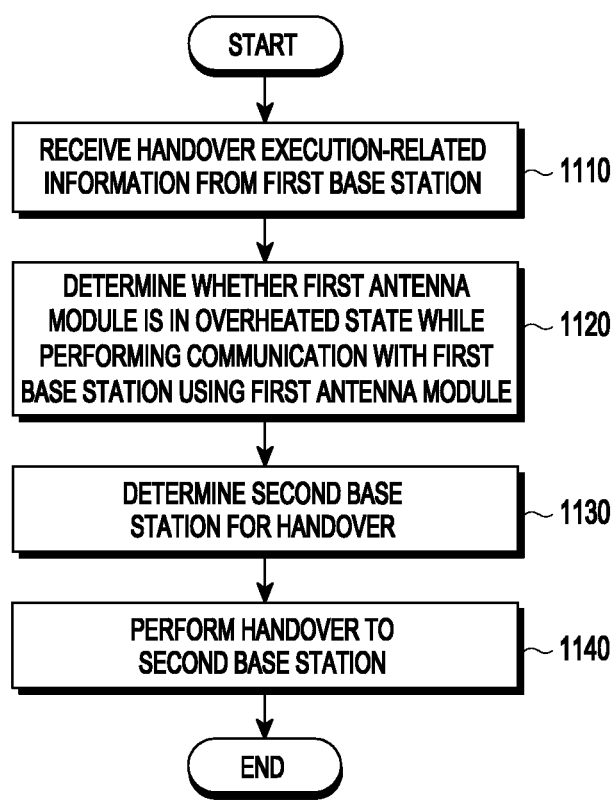
FIG. 11 is a flowchart illustrating an example method for performing beam change using a handover procedure by an electronic device according to various embodiments.

FIG. 11 is a flowchart illustrating an example method for performing beam change using a handover procedure by an electronic device 101 according to various embodiments. According to an embodiment, the electronic device 101 may change the antenna module used for data transmission/reception with the base station using a handover procedure in response to detecting an overheated state of the antenna module operating for data transmission/reception. The operations of FIG. 11 may be performed by at least one processor (e.g., the at least one processor 750 of FIG. 7, the processor 120 of FIG. 1, or the processor 120, the first communication 212, or the second communication processor 214 of FIG. 2) included in the electronic device 101.

Referring to FIG. 11, in operation 1110, the electronic device 101 may obtain handover execution-related information from the first base station. The handover execution-related information received from the first base station may be included in a dedicated or UE-specific RRC signal and received. The handover performance-related information may include a channel state reference value for performing handover, information for determining the channel state of a candidate base station based on measurements for one or more beams, or information for at least one candidate base station. The information for the at least one candidate base station regards a list of at least one candidate base station selectable as a target base station based on the channel state information measured for candidate base stations belonging to neighbor cells while the electronic device 101 (e.g., the electronic device 101 of FIG. 1) performs communication with the first base station and may include at least one of frequency bands or cell IDs of the at least one candidate base station. The handover execution-related information received from the first base station may include a timer value indicating a time during which the handover execution-related information is valid. According to an embodiment, when the timer expires, the channel state reference value for performing handover or information for at least one candidate base station, received from the first base station, may not be valid any longer. If the handover performance-related information or information for the at least one candidate base station is not valid any longer, the electronic device 101 may delete the information and obtain updated information from the first base station.

In operation 1120, the electronic device 101 may determine whether the first antenna module 710 is in an overheated state while receiving the serving beam via the first beam formed in the direction towards the first base station and communicating with the first base station. In operation 1120, the electronic device 101 may measure the signal strength of the neighbor beam received from the second base station using the second beam formed by the second antenna module 720. Whether the first antenna module 710 is overheated may be determined based on the temperature of the first antenna module 710 obtained from the first temperature sensor 730 included in the first antenna module 710 or disposed adjacent to the first antenna module 710. The first temperature sensor 730 may periodically or continuously measure the temperature of the first antenna module 710 while the first antenna module 710 performs a communication operation. For example, the electronic device 101 may determine that the first antenna module 710 is in an overheated state if it is identified that the temperature of the first antenna module 710 is equal to or greater than a first threshold temperature set as an overheat reference.

In operation 1130, in response to detecting the overheated state of the first antenna module 710, the electronic device 101 may determine a second base station to perform handover based on channel measurement information. According to an embodiment, the electronic device 101 may compare the channel state reference value with the signal strength measurements for the neighbor beams based on the handover execution-related information obtained in operation 1110 and may determine the neighbor beam, which is measured via the second beam formed by the second antenna module 720, as a target beam for performing handover based on the result of comparison. For example, the neighbor beam determined as the target beam may be any one of neighbor beams exceeding the channel state reference value or one for which the best signal strength is measured among neighbor beams exceeding the channel state reference value. For example, the handover execution-related information may be handover offset information. In this case, the at least one processor 750 may prevent frequent handover by determining the channel state reference value in a manner to add or subtract the offset information to/from the channel state of the serving beam or serving base station. According to various embodiments, the electronic device 101 may determine the second base station, which forms the second beam together with the second antenna module 720, as the target base station based on a list of at least one candidate base stations obtained in operation 1110. For example, the second base station may be one exhibiting the best channel state in the list of the at least one candidate base station or one selected from among candidate base stations exceeding the channel state reference value for performing handover.

According to various embodiments, the electronic device 101 may receive, from the first base station, an instruction regarding channel state measurement for one or more beams as a condition for performing a handover and may measure the strength of one or more beams according to the instruction received from the first base station to thereby measure the channel state of the target base station. For example, the electronic device 101 may measure the strengths of signals received through the one or more beams, calculate the average of the measurements indicating signal strengths not less than a reference value determined by the first base station, and determine it as the channel measurement state of the base station. As another example, the electronic device 101 may measure the strength of signals received through the one or more beams and determine that the measurement for the beam showing the best signal strength among them is the channel measurement state of the cell.

In operation 1140, in response to detecting the overheated state of the first antenna module 710, the electronic device 101 may perform handover to the second base station. For example, the electronic device 101 may attempt random access to the second base station among the candidate base stations belonging to neighbor cells and send a request for RRC connection reestablishment. If RRC connection reestablishment of the second base station is performed according to the request, the at least one processor 750 may receive an RRC connection establishment message from the second base station, change the existing candidate beam, received by the second beam formed between the second antenna module 720 and the second base station, to a new serving beam, and perform communication with the second base station.

According to any one of various embodiments, a method for performing a beam change by an electronic device including a plurality of antenna modules and a plurality of temperature sensors configured to measure a temperature corresponding to each of the plurality of antenna modules may comprise: determining whether a first antenna module is in an overheated state based on a temperature of the first antenna module obtained from a first temperature sensor while receiving a serving beam using a first beam formed by the first antenna module to perform communication with a first base station and measuring a signal strength of a neighbor beam using a second beam formed by a second antenna module and, based on the first antenna module being determined to be in the overheated state, performing a handover to a second base station, based on channel measurement information for the second base station.

According to various example embodiments, determining whether the first antenna module is in the overheated state may include determining that the first antenna module is in the overheated state based on the temperature of the first antenna module not being less than a first threshold temperature set as an overheat reference for the first antenna module.

According to various example embodiments, performing the handover to the second base station may include: obtaining, from the first base station, handover execution-related information including a channel state reference value for handover, comparing the channel state reference value with a signal strength value measured for the second antenna module, and performing the handover to the second base station based on a result of the comparison.

According to various example embodiments, performing the handover to the second base station may include: obtaining, from the first base station, information for at least one candidate base station and performing the handover to the second base station based on the information for the at least one candidate base station.

According to various example embodiments, the method may further comprise: sending a request for radio resource control (RRC) connection reestablishment to the second base station, receiving an RRC connection establishment message corresponding to the request from the second base station, and performing communication with the second base station using the second beam through the second antenna module.

According to various example embodiments, the method may further comprise identifying whether the temperature of the first antenna module is not less than a second threshold temperature set as a neighbor beam strength measurement reference for the first antenna module, excluding the first beam from a neighbor beam list if the temperature of the first antenna module is not less than the second threshold temperature, and adding the first beam to the neighbor beam list after a designated time elapses.

According to various example embodiments, adding the first antenna module to the neighbor beam list after the designated time elapses may include measuring the temperature of the first antenna module according to a designated period using the first temperature sensor and adding the first beam to the neighbor beam list if the measured temperature of the first antenna module is identified as less than the second threshold temperature.

Figure 12:
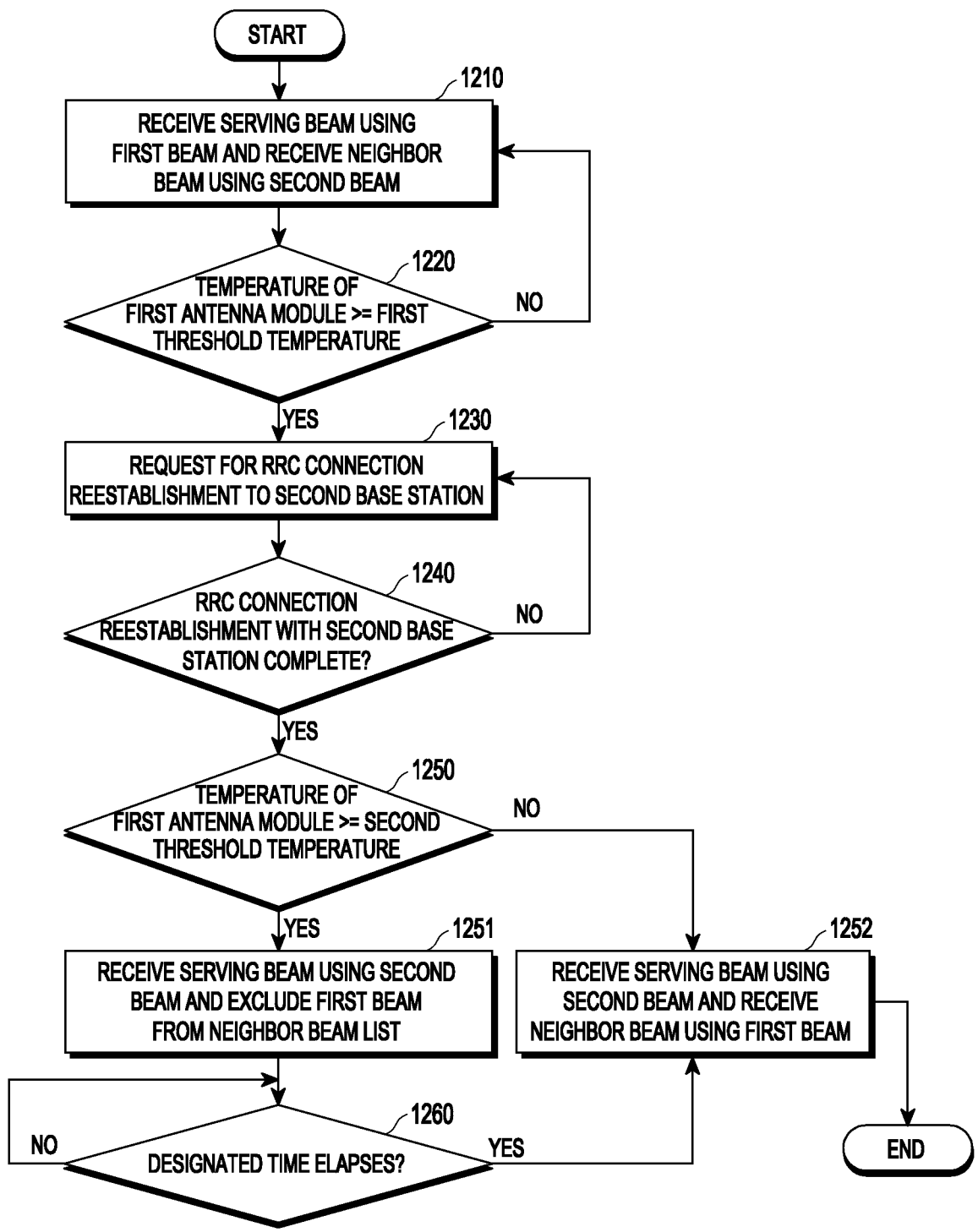
FIG. 12 is a flowchart illustrating an example operation of performing beam change using a handover procedure by an electronic device according to various embodiments.

FIG. 12 is a flowchart illustrating an example operation of performing beam change using a handover procedure by an electronic device 101 according to various embodiments. The operations of FIG. 12 may be performed by at least one processor (e.g., the at least one processor 750 of FIG. 7, the processor 120 of FIG. 1, or the processor 120, the first communication 212, or the second communication processor 214 of FIG. 2) included in the electronic device 101.

Referring to FIG. 12, in operation 1210, the electronic device 101 (e.g., the electronic device 101 of FIG. 1) may receive a serving beam from a first base station using a first beam formed by a first antenna module 710 and may perform communication. While the first antenna module 710 communicates with the first base station, the second antenna module 720 may be enabled when performing neighbor beam measurement. For example, if the second antenna module 720 is enabled for channel state measurement for the neighbor beam, the second antenna module 720 may form a second beam with a second base station to receive the neighbor beam and report a measurement result for the neighbor beam (e.g., an SSB or CSI-RS signal measurement result) to the first base station. According to various embodiments, the electronic device 101 may perform communication with the first base station using the first beam and measure the strength of the serving beam using the second beam of the second antenna module 720.

In operation 1220, the electronic device 101 may identify whether the temperature of the first antenna module 710 is equal to or greater than a first threshold temperature. The first threshold temperature is a temperature set as a reference for determining whether the first antenna module 710 is overheated, and when the temperature of the first antenna module 710 is identified to be higher than the first threshold temperature (yes in 1220), the first antenna module 710 may be determined to be in an overheated state.

In operation 1230, in response to detecting the overheated state of the first antenna module 710, the electronic device 101 may stop the communication operation of the first antenna module 710 and, to perform handover to the second base station using the second antenna module 720, send a request for RRC connection reestablishment to the second base station.

In operation 1240, the electronic device 101 may identify whether the RRC connection reestablishment with the second base station has been completed based on an RRC connection establishment message received from the second base station. If the RRC connection reestablishment with the second base station is identified (yes in 1240), the electronic device 101 may change the existing neighbor beam, received using the second beam, to a new serving beam and may perform communication with the second base station. According to various embodiments, if the electronic device 101 does not receive the RRC connection establishment message within a designated time (no in 1240), the electronic device 101 may retransmit an RRC connection reestablishment request message to the second base station.

In operation 1250, the electronic device 101 may identify whether the temperature of the first antenna module 710 is equal to or greater than a second threshold temperature. The second threshold temperature may be a neighbor beam measurement reference set for the first antenna module. If it is identified in operation 1250 that the temperature of the first antenna module 710 is equal to or greater than the second threshold temperature (yes in 1250), the electronic device 101 may receive the serving beam using the second beam formed by the second antenna module 720 and exclude the first antenna module 710 or the first beam from the neighbor beam list for a designated time not to perform channel state measurement on the first beam in operation 1251, thereby reducing the heat of the first antenna module 710 which is in the overheated state. In operation 1260, the electronic device 101 may identify whether the designated time elapses (yes in 1260) and determine whether to include the first antenna module 710 or the first beam back in the neighbor beam list. For example, upon identifying that the temperature of the first antenna module 710 is less than the second threshold temperature after the designated time, the electronic device 101 may add the first antenna module 710 or the first beam to the neighbor beam list and perform periodic channel state measurement on the first beam formed by the first antenna module 710. If it is identified that the temperature of the first antenna module 710 is the second threshold temperature or higher even when the designated time elapses, the electronic device 101 may put on hold adding the first antenna module 710 or the first beam to the neighbor beam list until the temperature of the first antenna module 710 falls below the second threshold temperature.

If it is identified in operation 1250 that the temperature of the first antenna module 710 is less than the second threshold temperature (no in 1250), the electronic device 101 may receive the serving beam using the second beam formed by the second antenna module 720, communicate with the second base station, and perform periodic channel state measurement on the first beam in operation 1252.

Figure 13:
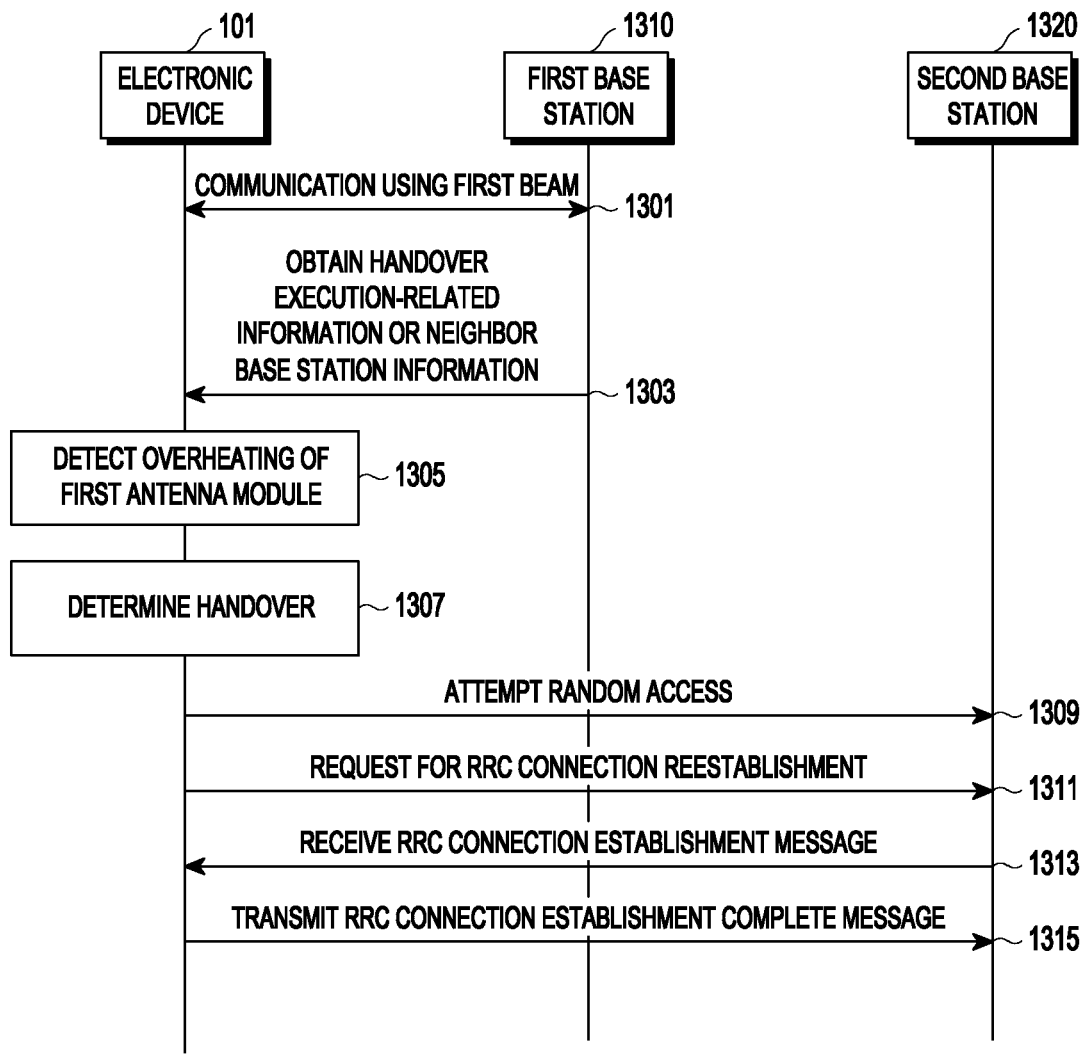
FIG. 13 is a signal flow diagram illustrating an example procedure for performing beam change by an electronic device according to various embodiments.

FIG. 13 is a signal flow diagram illustrating an example procedure for performing beam change by an electronic device 101 according to various embodiments. In FIG. 13, a first base station 1310 is a serving base station (e.g., a gNB or the NR base station 450 of FIG. 4) that transmits and receives data through a wireless connection between the electronic device 101 and a 5G network, and a second base station 1320 may be a base station (e.g., a gNB or the NR base station 450 of FIG. 4) belonging to a neighbor cell adjacent to the cell to which the first base station belongs.

Referring to FIG. 13, in operation 1301, the electronic device 101 (e.g., the electronic device 101 of FIG. 1) may communicate with the first base station 1310 using a first beam. The first beam is a beam formed by the first antenna module 710 in the direction towards the first base station 1310, and the electronic device 101 may receive the serving beam from the first base station 1310 via the first beam. While performing communication with the first base station 1310 using the first beam, the electronic device 101 may measure the channel state of the neighbor beam using another antenna module (e.g., the second antenna module 720). For example, the second antenna module 720 may be enabled only upon neighbor beam measurement, reporting the result of measurement on the receive signal of the second beam formed towards the second base station (e.g., an SSB or CSI-RS signal measurement result) to the first base station 1310.

In operation 1303, the electronic device 101 may obtain handover execution-related information from the first base station 1310. The handover execution-related information received from the first base station 1310 may be included in a dedicated or UE-specific RRC signal and received. According to various embodiments, the handover performance-related information may include a channel state reference value for performing handover, handover offset information, information for determining the channel state of a candidate base station by measuring the strength of one or more neighbor beams or candidate beams, or information for at least one candidate base station. If obtaining the channel state reference value information for performing handover from the first base station, the electronic device 101 may compare the channel state reference value with the signal strength measurements for the neighbor beams and may determine the existing neighbor beam received via the second beam formed by the second antenna module 720 as a target beam for performing handover, based on the result of comparison. According to various embodiments, a method for measuring the existing serving beam using the second beam formed by the second antenna module 720 may be possible. According to various embodiments, the neighbor beam determined as the target beam may be any one of neighbor beams exceeding the channel state reference value or one for which the best signal strength is measured among neighbor beams exceeding the channel state reference value. If obtaining the handover offset information from the first base station, the electronic device 101 may determine the channel state reference value in such a manner as to add or subtract the offset information to/from the channel state of the second base station or serving beam.

According to various embodiments, the information for the at least one candidate base station regards a list of at least one candidate base station selectable as a target base station based on the channel state information measured for candidate base stations belonging to neighbor cells while the electronic device 101 performs communication with the first base station and may include at least one of frequency bands or cell IDs of the at least one candidate base station. Upon obtaining the information for the at least one candidate base station from the first base station, the electronic device 101 may determine that the second base station forming a second beam with the second antenna module 720 is the target base station based on the list of the at least one candidate base station. For example, the second base station may be one exhibiting the best channel state in the list of the at least one candidate base station or one selected from among candidate base stations exceeding the channel state reference value for performing handover.

According to various embodiments, in operation 1303, the handover execution-related information received by the electronic device 101 from the first base station may include a timer value indicating a time during which information for the at least one candidate base station is valid. For example, when the timer expires, the handover execution-related information or information for at least one candidate base station, received from the first base station, may not be valid any longer. If the handover execution-related information or information for the at least one candidate base station is not valid any longer, the electronic device 101 may delete the information and obtain updated information from the first base station.

In operation 1305, the electronic device 101 may detect overheating of the first antenna module 710 performing communication with the first base station 1310. Whether the first antenna module 710 is overheated may be determined based on temperature information obtained from the first temperature sensor 730 included in the first antenna module 710 or disposed adjacent to the first antenna module 710. For example, the electronic device 101 may determine that the first antenna module 710 is in an overheated state if it is identified that the temperature of the first antenna module 710 is equal to or greater than a first threshold temperature set as an overheat reference while communicating with the first base station 1310 using the first antenna module 710.

In operation 1307, in response to detecting the overheated state of the first antenna module 710, the electronic device 101 may stop the operation of the first antenna module 710 and determine to perform handover to the second base station 1320 determined as the target base station. The electronic device 101 may attempt random access to the second base station 1320 in operation 1309 and may send a request for RRC connection reestablishment to the second base station 1320 in operation 1311. According to various embodiments, such a method may also be possible where the channel state of the serving beam measured by the second antenna module 720 is compared with the reference from the first base station, and data transmission/reception continues using the serving beam of the first base station without performing handover.

If receiving an RRC connection establishment message from the second base station 1320 in operation 1313, the electronic device 101 may transmit an RRC connection establishment complete message to the second base station 1320 in operation 1315, completing the handover procedure. If the handover procedure is complete, the electronic device 101 may change the existing neighbor beam, received using the second beam via the second antenna module 720, into a new serving beam and perform communication with the second base station 1320.

Figure 14:
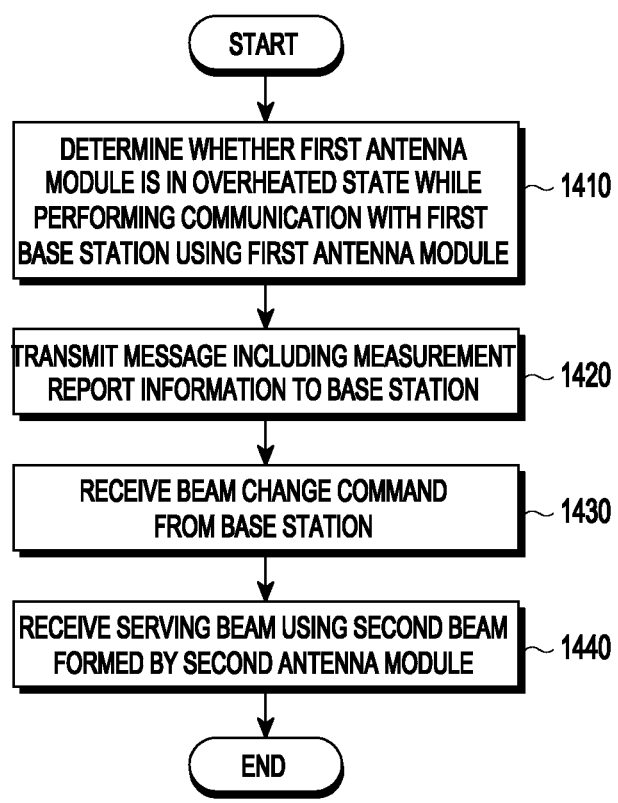
FIG. 14 is a flowchart illustrating an example method for performing beam change using a measurement reporting procedure by an electronic device according to various embodiments.

FIG. 14 is a flowchart illustrating an example method for performing beam change using a measurement reporting procedure by an electronic device 101 according to various embodiments. According to an embodiment, the electronic device 101 may change the antenna module used for data transmission/reception with the base station using a measurement reporting procedure in response to detecting an overheated state of the antenna module operating for data transmission/reception. The operations of FIG. 14 may be performed by at least one processor (e.g., the at least one processor 750 of FIG. 7, the processor 120 of FIG. 1, or the processor 120, the first communication 212, or the second communication processor 214 of FIG. 2) included in the electronic device 101.

Referring to FIG. 14, in operation 1410, the electronic device 101 (e.g., the electronic device 101 of FIG. 1) may determine whether a first antenna module 710 is in an overheated state while receiving a serving beam using a first beam formed by the first antenna module 710 and performing communication with a base station. In operation 1410, the electronic device 101 may measure the signal strength of the candidate beam received from the base station using the second beam formed by a second antenna module 720. Whether the first antenna module 710 is overheated may be determined based on the temperature of the first antenna module 710 obtained from the first temperature sensor 730 included in the first antenna module 710 or disposed adjacent to the first antenna module 710. The first temperature sensor 730 may periodically or continuously measure the temperature of the first antenna module 710 while the first antenna module 710 performs a communication operation. For example, the electronic device 101 may determine that the first antenna module 710 is in an overheated state if it is identified that the temperature of the first antenna module 710 is equal to or greater than a first threshold temperature set as an overheat reference.

In operation 1420, in response to detecting the overheated state of the first antenna module 710, the electronic device 101 may transmit, to the base station, a message including measurement report information regarding the signal strength measured from the first antenna module 710 or the second antenna module 720. For example, the measurement report information may indicate that the signal strength measured from the second antenna module 720 is greater than the signal strength measured from the first antenna module 710 by a threshold or more. The signal strength may be an RSRP or a BRSRP.

According to various embodiments, the electronic device 101 may select a beam adjacent to the first beam (e.g., a beam formed in a direction slightly off the serving beam) from among the plurality of beams formed for the base station, measure the signal strength, determine the measured signal strength as the signal strength of the serving beam received using the first beam via the first antenna module 710, and generate the measurement report information. According to various embodiments, the electronic device 101 may stop the operation of the first antenna module 710 determined to be in the overheated state, measure the signal strength of the first beam and the signal strength of the second beam using the second antenna module 720, and generate the measurement report information. If it is identified that the signal strength of the second beam measured using the second antenna module 720 is larger, by the threshold or more, than the signal strength of the first beam measured using the second antenna module 720, the electronic device 101 may include the measurements for the first beam and the second beam in the message and transmit it to the base station. According to various embodiments, if it is identified that the signal strength of the second beam is not larger, by the threshold or more, than the signal strength of the serving beam, the electronic device 101 may receive the existing serving beam through the second antenna module 720 and continue communication with the base station.

In operation 1430, the electronic device 101 may receive a beam change command corresponding to the transmitted message from the base station. Upon receiving the beam change command from the base station, the electronic device 101 may configure to receive the serving beam using the second beam through the second antenna module 720 and perform communication with the base station using the second antenna module 720. According to various embodiments, the beam change command may be a handover command. In other words, the beam change command may be a message instructing to change to a beam transmitted from a neighbor base station according to the determination by the base station based on the measurement result from the terminal. Upon receiving the handover command, as the beam change command, from the base station, the electronic device 101 may configure to perform handover to the second base station via the second antenna module 720 and receive the serving beam using the second beam and perform communication with the second base station using the second antenna module 720. According to various embodiments, to receive the beam change command from the base station, the electronic device 101 may transmit, to the base station, a beam change request for receiving the serving beam via the second beam, instead of the message regarding measurement report information of operation 1420. For example, the electronic device 101 may transmit, to the base station, the beam change request through a separate message or signaling or may request a serving beam change using a random access channel (RACH) signal.

In operation 1440, the electronic device 101 may receive a serving beam using a second beam formed by the second antenna module 720 based on the beam change command and perform communication with the base station.

Figure 15:
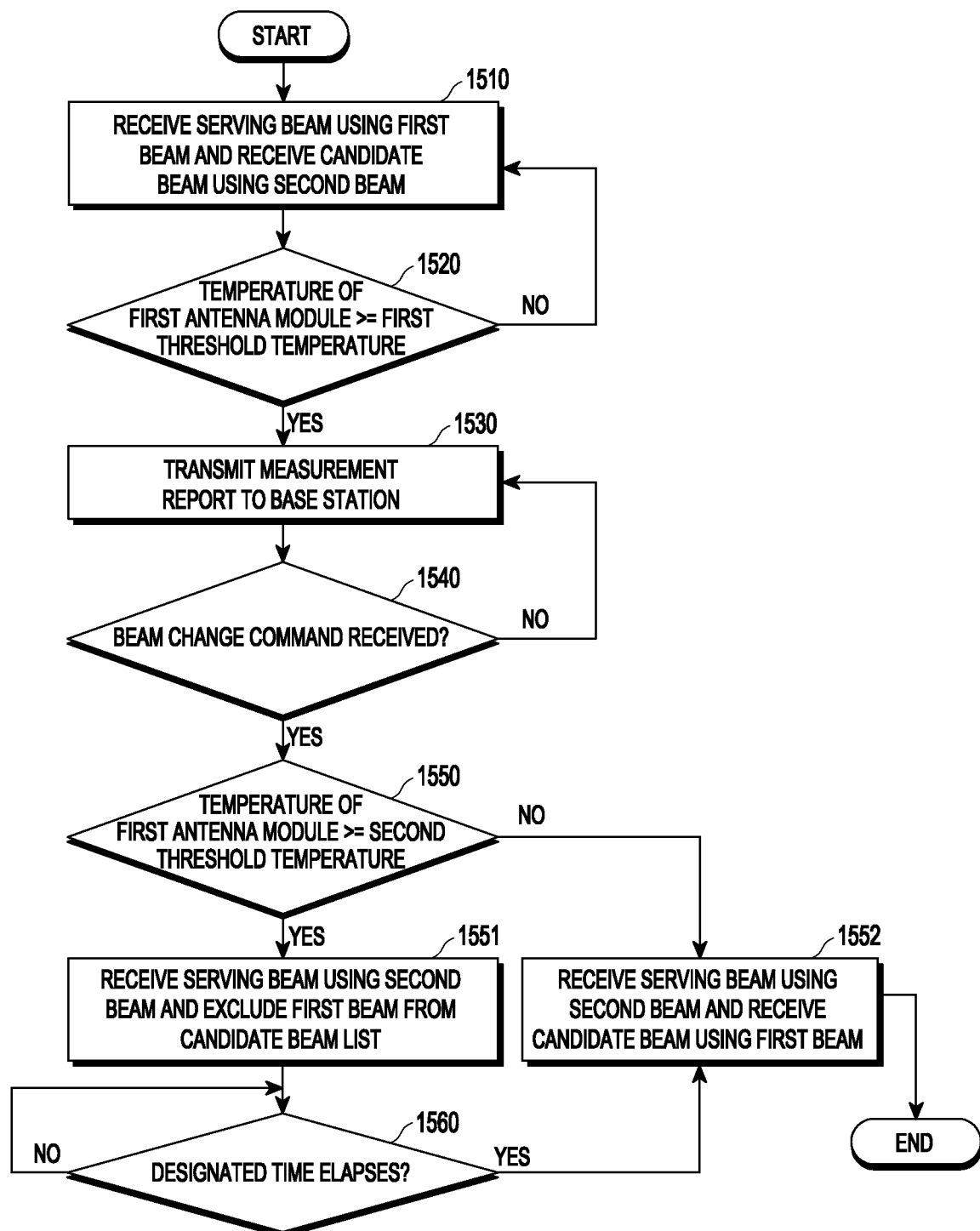
FIG. 15 is a flowchart illustrating an example operation of performing beam change using a measurement reporting procedure by an electronic device according to various embodiments.

FIG. 15 is a flowchart illustrating an example operation of performing beam change using a measurement reporting procedure by an electronic device 101 according to various embodiments. The operations of FIG. 15 may be performed by at least one processor (e.g., the at least one processor 750 of FIG. 7, the processor 120 of FIG. 1, or the processor 120, the first communication 212, or the second communication processor 214 of FIG. 2) included in the electronic device 101.

Referring to FIG. 15, in operation 1510, the electronic device 101 (e.g., the electronic device 101 of FIG. 1) may receive a serving beam from a base station using a first beam formed by a first antenna module 710 and may perform communication. While the first antenna module 710 communicates with the base station, the second antenna module 720 may be enabled only when performing neighbor beam measurement. For example, if the second antenna module 720 is enabled for channel state measurement for the candidate beam, the second antenna module 720 may form a second beam with the base station to receive the candidate beam and report a measurement result for the candidate beam (e.g., an SSB or CSI-RS signal measurement result) to the base station. According to various embodiments, the electronic device 101 may perform communication with the first base station using the first beam and measure the strength of the serving beam using the second beam of the second antenna module 720.

In operation 1520, the electronic device 101 may identify whether the temperature of the first antenna module 710 is equal to or greater than a first threshold temperature. The first threshold temperature is a temperature set as a reference for determining whether the first antenna module 710 is overheated, and when the temperature of the first antenna module 710 is identified to be higher than the first threshold temperature (yes in 1520), the first antenna module 710 may be determined to be in an overheated state.

In operation 1530, in response to detecting the overheated state of the first antenna module 710, the electronic device 101 may transmit, to the base station, a message including measurement report information regarding the signal strength measured from the first antenna module 710 or the second antenna module 720, so as to change the serving beam. The measurement report information may indicate that the signal strength of the candidate beam measured from the second antenna module 720 is greater than the signal strength of the serving beam measured from the first antenna module 710 by a threshold or more.

In operation 1540, the electronic device 101 may identify whether a beam change command is received from the base station. Upon receiving the beam change command from the base station (yes in 1540), the electronic device 101 may configure to receive the serving beam using the second beam through the second antenna module 720 and perform communication with the base station using the second antenna module 720. According to various embodiments, the beam change command may be a handover command. In other words, the beam change command may be a message instructing to change to a beam transmitted from a neighbor base station according to the determination by the base station based on the measurement result from the terminal. Upon receiving the handover command, as the beam change command, from the base station, the electronic device 101 may configure to perform handover to the second base station via the second antenna module 720 and receive the serving beam using the second beam and perform communication with the second base station using the second antenna module 720. According to various embodiments, if the electronic device 101 does not receive the beam change command within a designated time (no in 1540), the electronic device 101 may retransmit a message including the measurement report information to the base station.

In operation 1550, the electronic device 101 may identify whether the temperature of the first antenna module 710 is equal to or greater than a second threshold temperature. The second threshold temperature may be a candidate beam measurement reference set for the first antenna module. If it is identified in operation 1550 that the temperature of the first antenna module 710 is equal to or greater than the second threshold temperature (yes in 1550), the electronic device 101 may receive the serving beam using the second beam formed by the second antenna module 720 and exclude the first antenna module 710 or the first beam from the candidate beam list for a designated time not to perform channel state measurement on the first beam in operation 1551, thereby reducing the heat of the first antenna module 710 which is in the overheated state. In operation 1560, the electronic device 101 may identify whether the designated time elapses (yes in 1560) and determine whether to include the first antenna module 710 or the first beam back in the candidate beam list. For example, upon identifying that the temperature of the first antenna module 710 is less than the second threshold temperature after the designated time, the electronic device 101 may add the first antenna module 710 or the first beam to the candidate beam list and perform periodic channel state measurement on the first beam formed by the first antenna module 710. If it is identified that the temperature of the first antenna module 710 is the second threshold temperature or higher even when the designated time elapses, the electronic device 101 may put on hold adding the first antenna module 710 or the first beam to the candidate beam list until the temperature of the first antenna module 710 falls below the second threshold temperature.

If it is identified in operation 1550 that the temperature of the first antenna module 710 is less than the second threshold temperature (no in 1550), the electronic device 101 may receive the serving beam using the second beam through the second antenna module 720, communicate with the base station, and perform periodic channel state measurement on the first beam in operation 1552.

Figure 16:
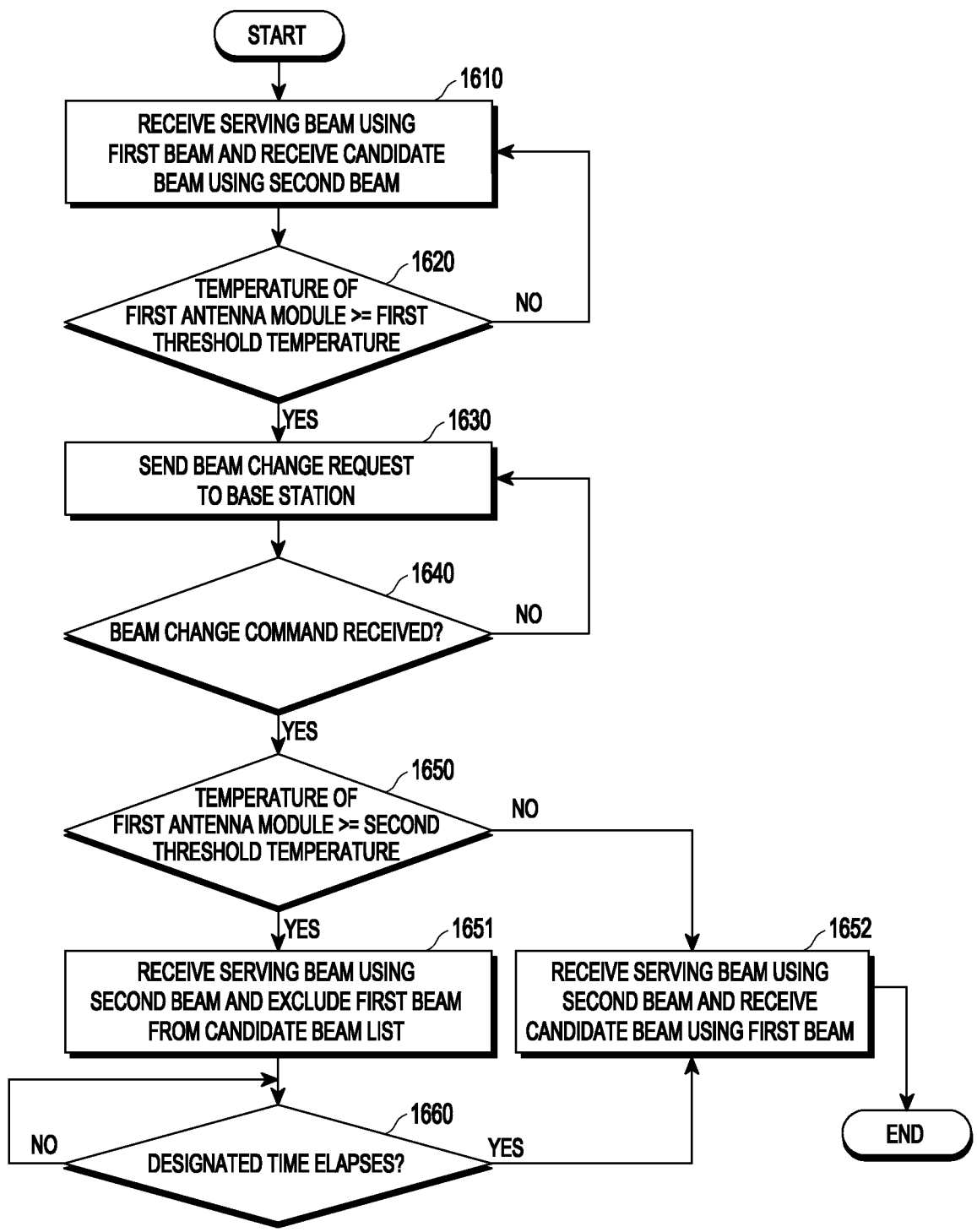
FIG. 16 is a flowchart illustrating an example operation of performing beam change via a beam change request by an electronic device according to various embodiments.

FIG. 16 is a flowchart illustrating an example operation of performing beam change via a beam change request by an electronic device 101 according to various embodiments. The operations of FIG. 16 may be performed by at least one processor (e.g., the at least one processor 750 of FIG. 7, the processor 120 of FIG. 1, or the processor 120, the first communication 212, or the second communication processor 214 of FIG. 2) included in the electronic device 101.

Referring to FIG. 16, in operation 1610, the electronic device 101 may receive a serving beam via a first beam formed by the base station and the first antenna module 710 and perform communication. While the first antenna module 710 communicates with the base station, the second antenna module 720 may be enabled only when performing neighbor beam measurement. According to various embodiments, the electronic device 101 may perform communication with the first base station using the first beam and measure the strength of the serving beam using the second beam of the second antenna module 720.

In operation 1620, the electronic device 101 may identify whether the temperature of the first antenna module 710 is equal to or greater than a first threshold temperature set as a reference for determining overheating. If the temperature of the first antenna module 710 is equal to or greater than the first threshold temperature (yes in 1620), the electronic device 101 may determine that the first antenna module 710 is in an overheated state.

In operation 1630, in response to detecting the overheated state of the first antenna module 710, the electronic device 101 may transmit, to the base station, a beam change request for receiving the serving beam via the second beam formed by the second antenna module 720. For example, the electronic device 101 may transmit, to the base station, the beam change request through a separate message or signaling or may request a serving beam change using an RACH signal.

In operation 1640, the electronic device 101 may identify whether a beam change command is received from the base station. Upon receiving the beam change command from the base station (yes in 1640), the electronic device 101 may configure to receive the serving beam using the second beam through the second antenna module 720 and perform communication with the base station using the second antenna module 720. According to various embodiments, if the electronic device 101 does not receive the beam change command within a designated time (no in 1640), the electronic device 101 may retransmit a message including the beam change request to the base station.

Operations 1650 and 1660 may be performed, corresponding to operations 1550 and 1560 of FIG. 15.

Figure 17:
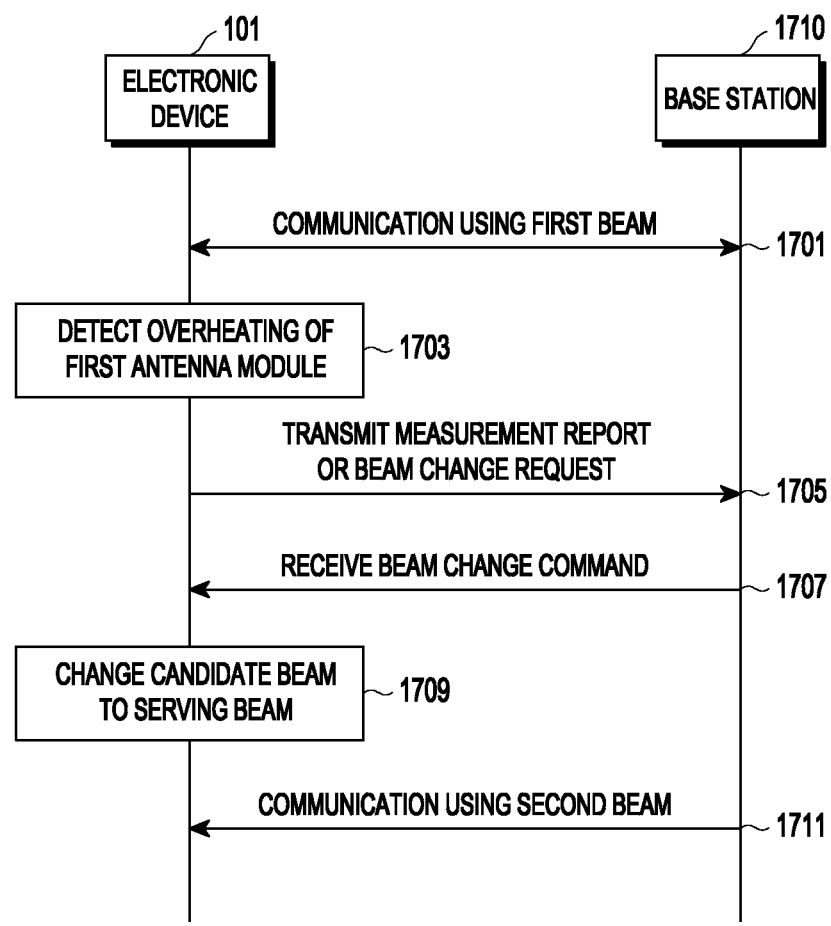
FIG. 17 is a signal flow diagram illustrating an example procedure for performing beam change by an electronic device according to various embodiments.

FIG. 17 is a signal flow diagram illustrating an example procedure for performing beam change by an electronic device according to various embodiments. In FIG. 17, a base station 1710 is a serving base station (e.g., a gNB) that transmits and receives data through a wireless connection with the electronic device 101 and may correspond to the NR base station 450 of FIG. 4.

Referring to FIG. 17, in operation 1701, the electronic device 101 may communicate with the base station 1710 using a first beam. The first beam may be a beam formed between the first antenna module 710 of the electronic device 101 and the base station 1710 and may be a beam configured to receive a serving beam from the base station. While performing communication with the base station 1710 using the first beam, the electronic device 101 may measure the channel state of the candidate beam using another antenna module (e.g., the second antenna module 720). For example, the second antenna module 720 may be enabled only upon candidate beam measurement, reporting the result of measurement on the receive signal of the second beam formed towards the base station 1710 (e.g., an SSB or CSI-RS signal measurement result) to the base station 1710.

In operation 1703, the electronic device 101 may detect overheating of the first antenna module 710 performing communication with the base station 1710. Whether the first antenna module 710 is overheated may be determined based on temperature information obtained from the first temperature sensor 730 disposed adjacent to the first antenna module 710. For example, the electronic device 101 may determine that the first antenna module 710 is in an overheated state if it is identified that the temperature of the first antenna module 710 is equal to or greater than a first threshold temperature set as an overheat reference while communicating with the base station 1710 using the first antenna module 710.

In operation 1705, in response to detecting the overheated state of the first antenna module 710, the electronic device 101 may transmit a message including measurement report information or a beam change request to the base station 1710. According to various embodiments, the measurement report information may regard the signal strength measured from the first antenna module 710 or the second antenna module 720 and may indicate that the signal strength of the candidate beam measured from the second antenna module 720 is larger than the signal strength of the serving beam measured from the first antenna module 710 by a threshold or more. For example, the electronic device 101 may select a beam adjacent to the first beam (e.g., a beam formed in a direction slightly off the serving beam) from among the plurality of beams formed for the base station, measure the signal strength, determine the measured signal strength as the signal strength of the serving beam received using the first beam via the first antenna module 710, and generate the measurement report information. As another example, the electronic device 101 may stop the operation of the first antenna module 710 determined to be in the overheated state, measure the received signal strength of the first beam and the received signal strength of the second beam using the second antenna module 720, and generate the measurement report information. If it is identified that the received signal strength of the second beam is not larger, by the threshold or more, than the signal strength of the serving beam, the electronic device 101 may receive the existing serving beam through the second antenna module 720 and continue communication with the base station.

According to various embodiments, the beam change request may indicate a change to receive the serving beam via the second beam. The electronic device 101 may directly transfer the beam change request to the base station 1710 through a separate message or signaling or using an RACH signal.

In operation 1707, the electronic device 101 may receive, from the base station 1710, a beam change command corresponding to the beam change request or the measurement report information.

The electronic device 101 may change the existing candidate beam, received using the second beam, into a new serving beam based on the beam change command in operation 1709 and, in operation 1711, the electronic device 101 may communicate with the base station 1710 using the second beam.

Figure 18:
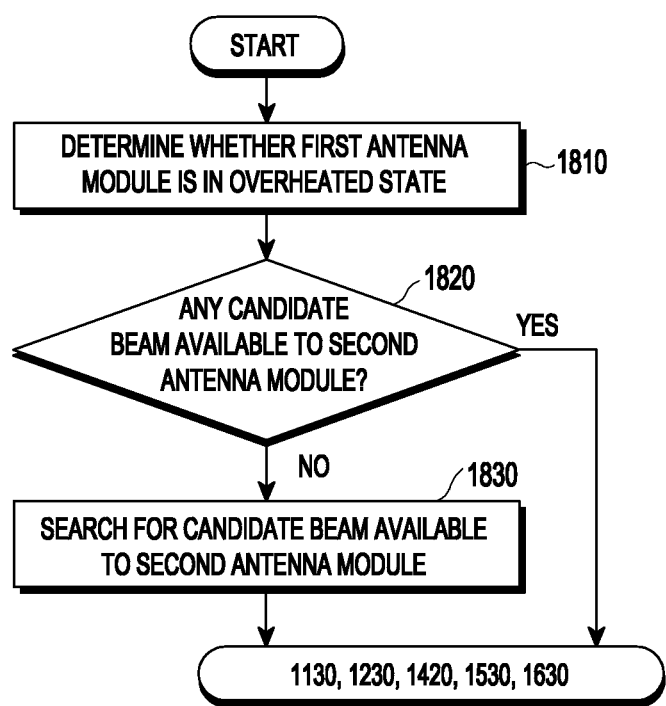
FIG. 18 is a flowchart illustrating an example operation in a case where there is no candidate beam when overheating of an antenna module in use occurs, according to various embodiments.

FIG. 18 is a flowchart illustrating an example operation in a case where there is no candidate beam when overheating of an antenna module in use occurs, according to various embodiments. The operations of FIG. 18 may be performed by at least one processor (e.g., the at least one processor 750 of FIG. 7, the processor 120 of FIG. 1, or the processor 120, the first communication 212, or the second communication processor 214 of FIG. 2) included in the electronic device 101.

Referring to FIG. 18, in operation 1810, the electronic device 101 may determine an overheated state of the first antenna module 710 operating for data transmission/reception. While the first antenna module 710 operates for data transmission/reception, the electronic device 101 may obtain temperature information measured for the first antenna module 710 from the first temperature sensor 730 disposed adjacent to the first antenna module 710. For example, the electronic device 101 may determine that the first antenna module 710 is in an overheated state if it is identified that the temperature of the first antenna module 710 is equal to or greater than a first threshold temperature set as an overheat reference.

In operation 1820, in response to detecting the overheated state of the first antenna module 710, the electronic device 101 may identify whether there is a neighbor beam or candidate beam available for data transmission/reception in the second antenna module 720 (e.g., a neighbor beam or candidate beam meeting a signal strength reference value condition for beam change). If it is identified in operation 1820 that there is a neighbor beam or candidate beam available to the second antenna module 720 (yes in 1820), the electronic device 101 may immediately perform operations for beam change (e.g., after operation 1130 of FIG. 11, operation 1230 of FIG. 12, operation 1420 of FIG. 14, operation 1530 of FIG. 15, or operation 1630 of FIG. 16).

If it is identified in operation 1820 that there is no neighbor beam or candidate beam available to the second antenna module 720 (no in 1820), the electronic device 101 may perform operations for beam change after searching for a neighbor beam or candidate beam until a neighbor beam or candidate beam available to the second antenna module 720 appears (e.g., after operation 1130 of FIG. 11, operation 1230 of FIG. 12, operation 1420 of FIG. 14, operation 1530 of FIG. 15, or operation 1630 of FIG. 16).

The electronic device according to various embodiments may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, there may be provided a storage medium storing instructions configured to, when executed by at least one processor 750, enable or cause the at least one processor to perform at least one operation which, in a method for performing a beam change by an electronic device 101 including a plurality of antenna modules and a plurality of temperature sensors configured to measure a temperature corresponding to each of the plurality of antenna modules, may comprise determining whether a first antenna module 710 is in an overheated state based on a temperature of the first antenna module 710 obtained from a first temperature sensor 730 while receiving a serving beam using a first beam formed by the first antenna module 710 to perform communication with a first base station and measuring a signal strength of a neighbor beam using a second beam formed by a second antenna module 720 and, if the first antenna module 710 is determined to be in the overheated state, performing a handover to a second base station, adjacent to the first base station, based on channel measurement information for the second base station.

The embodiments disclosed herein for the purpose of description and understanding of the disclosed technology and does not limit the scope of the disclosure. Accordingly, the scope of the disclosure should be understood as including all changes or various embodiments based on the technical spirit of the disclosure.

What is claimed is:

1. An electronic device, comprising:
   a first antenna module including at least one antenna configured to form a first beam and receive a serving beam from a first base station;
   a second antenna module including at least one antenna configured to form a second beam and measure a signal strength of a signal of a neighbor beam received from a second base station;
   a first temperature sensor configured to measure a temperature corresponding to the first antenna module;
   a second temperature sensor configured to measure a temperature corresponding to the second antenna module;
   at least one processor operatively connected with the first antenna module or the second antenna module; and
   a memory operatively connected with the at least one processor, wherein the memory stores instructions which, when executed, cause the at least one processor to:
   determine whether the first antenna module is in an overheated state based on the temperature of the first antenna module obtained from the first temperature sensor while performing communication with the first base station through the first antenna module; and
   based on the first antenna module being determined to be in the overheated state, perform a handover to the second base station based on channel measurement information for the second base station.

2. The electronic device of claim 1, wherein the instructions when executed, cause the at least one processor to determine that the first antenna module is in the overheated state based on the temperature of the first antenna module being greater than or equal to a first threshold temperature set as an overheat reference for the first antenna module.

3. The electronic device of claim 1, wherein the instructions, when executed, cause the at least one processor to:
   obtain, from the first base station, handover execution-related information including a channel state reference value for handover;
   compare the channel state reference value with a signal strength value measured for the second antenna module; and
   perform a handover to the second base station based on a result of the comparison.

4. The electronic device of claim 1, wherein the instructions, when executed, cause the at least one processor to:
   obtain, from the first base station, information for at least one candidate base station; and
   perform a handover to the second base station based on the information for the at least one candidate base station.

5. The electronic device of claim 1, wherein the instructions, when executed, cause the at least one processor to control the electronic device to:
   send a request for radio resource control (RRC) connection reestablishment to the second base station;
   receive an RRC connection establishment message corresponding to the request from the second base station; and
   perform communication with the second base station using the second antenna module.

6. The electronic device of claim 1, wherein the instructions, when executed, cause the at least one processor to:
   identify whether the temperature of the first antenna module is greater than or equal to a second threshold temperature set as a neighbor beam strength measurement reference for the first antenna module;
   exclude the first beam from a neighbor beam list based on the temperature of the first antenna module being greater than or equal to the second threshold temperature; and
   add the first beam to the neighbor beam list after a designated time elapses.

7. The electronic device of claim 6, wherein the instructions, when executed, cause the at least one processor to:
   measure the temperature of the first antenna module according to a designated period using the first temperature sensor; and
   add the first beam to the neighbor beam list based on the measured temperature of the first antenna module being identified as less than the second threshold temperature.

8. A method for performing a beam change by an electronic device including a plurality of antenna modules and a plurality of temperature sensors configured to measure a temperature corresponding to each of the plurality of antenna modules, the method comprising:
   determining whether a first antenna module is in an overheated state based on a temperature of the first antenna module obtained from a first temperature sensor while receiving a serving beam using a first beam formed by the first antenna module to perform communication with a first base station and measuring a signal strength of a neighbor beam using a second beam formed by a second antenna module; and
   based on the first antenna module being determined to be in the overheated state, performing a handover to a second base station based on channel measurement information for the second base station.

9. The method of claim 8, wherein determining whether the first antenna module is in the overheated state includes determining that the first antenna module is in the overheated state based on the temperature of the first antenna module being greater than or equal to a first threshold temperature set as an overheat reference for the first antenna module.

10. The method of claim 8, wherein performing the handover to the second base station includes:
obtaining, from the first base station, handover execution-related information including a channel state reference value for handover;
comparing the channel state reference value with a signal strength value measured for the second antenna module; and
performing the handover to the second base station based on a result of the comparison.

11. The method of claim 8, wherein performing the handover to the second base station includes:
obtaining, from the first base station, information for at least one candidate base station; and
performing the handover to the second base station based on the information for the at least one candidate base station.

12. The method of claim 8, further comprising:
sending a request for radio resource control (RRC) connection reestablishment to the second base station;
receiving an RRC connection establishment message corresponding to the request from the second base station; and
performing communication with the second base station using the second beam through the second antenna module.

13. The method of claim 8, further comprising:
identifying whether the temperature of the first antenna module is greater than or equal to a second threshold temperature set as a neighbor beam strength measurement reference for the first antenna module;
excluding the first beam from a neighbor beam list based on the temperature of the first antenna module being greater than or equal to the second threshold temperature; and
adding the first beam to the neighbor beam list after a designated time elapses.

14. The method of claim 13, wherein adding the first beam to the neighbor beam list after the designated time elapses includes measuring the temperature of the first antenna module according to a designated period using the first temperature sensor and adding the first beam to the neighbor beam list based on the measured temperature of the first antenna module being identified as less than the second threshold temperature.

* * * * *